United States Patent
Ito et al.

(10) Patent No.: US 11,554,658 B2
(45) Date of Patent: Jan. 17, 2023

(54) HYBRID VEHICLE

(71) Applicant: Kanzaki Kokyukoki Mfg. Co., Ltd., Hyogo (JP)

(72) Inventors: Fumiaki Ito, Hyogo (JP); Koji Kiyooka, Hyogo (JP); Tasuku Inoue, Hyogo (JP); Masato Arata, Hyogo (JP)

(73) Assignee: KANZAKI KOKYUKOKI MFG. CO., LTD., Amagasaki (JP)

( * ) Notice: Subject to any disclaimer, the term of this patent is extended or adjusted under 35 U.S.C. 154(b) by 331 days.

(21) Appl. No.: 16/995,975

(22) Filed: Aug. 18, 2020

(65) Prior Publication Data
US 2021/0053435 A1 Feb. 25, 2021

(30) Foreign Application Priority Data

Aug. 20, 2019 (JP) .............................. JP2019-150178
Aug. 20, 2019 (JP) .............................. JP2019-150224

(51) Int. Cl.
*B60K 6/52* (2007.10)
*B60K 6/24* (2007.10)
*B60K 6/26* (2007.10)
*B60K 23/08* (2006.01)
*B60K 26/02* (2006.01)
*B60K 6/543* (2007.10)
*B60K 6/38* (2007.10)

(52) U.S. Cl.
CPC ................. *B60K 6/52* (2013.01); *B60K 6/24* (2013.01); *B60K 6/26* (2013.01); *B60K 6/38* (2013.01); *B60K 6/543* (2013.01); *B60K 23/08* (2013.01); *B60K 26/02* (2013.01); *B60Y 2200/221* (2013.01); *B60Y 2200/92* (2013.01); *B60Y 2300/182* (2013.01); *B60Y 2300/18025* (2013.01); *B60Y 2400/82* (2013.01)

(58) Field of Classification Search
CPC ... B60K 6/52; B60K 6/24; B60K 6/26; B60K 6/38; B60K 23/08; B60K 26/02
See application file for complete search history.

(56) References Cited

U.S. PATENT DOCUMENTS

| 8,831,859 B2* | 9/2014 | Meitinger | B60W 20/00 |
| | | | 903/902 |
| 9,067,593 B2* | 6/2015 | Dufford | B60W 10/06 |
| 9,592,831 B2* | 3/2017 | Blakeway | B60W 10/06 |

FOREIGN PATENT DOCUMENTS

JP H1075505 A 3/1998

* cited by examiner

*Primary Examiner* — John D Walters
(74) *Attorney, Agent, or Firm* — Cantor Colburn LLP

(57) ABSTRACT

A hybrid vehicle includes an engine that drives first wheel, and a motor that drives second wheel. The hybrid vehicle includes (1) a minute speed launch support mode where the hybrid vehicle is driven only by the motor as a drive source, (2) a sudden launch support mode where the hybrid vehicle is driven by the engine and motor as the drive source, and (3) a smooth launch support mode where the hybrid vehicle is driven only by the motor as the drive source in an early stage, is driven by the engine and motor in a middle stage, and is driven only by the engine in a late stage, and if an operation amount of an acceleration instruction unit is not 0 or is substantially not 0, any one of the support modes is executed according to an operation status of the acceleration instruction unit.

11 Claims, 27 Drawing Sheets

|   | ACCELERATOR OPENING | ACCELERATOR CHANGE SPEED | VEHICLE SPEED | ENGINE RPM |
|---|---|---|---|---|
| ① | AO1 + α OR MORE | — | — | — |
| ② | AO1 − α OR LESS | — | V1 OR LESS | — |
| ③ | AO2 + α OR MORE | VA1 OR MORE | — | — |
| ④ | AO2 − α OR LESS | — | V2 OR LESS | N1 OR LESS |
| ⑤ | AO1 − α OR LESS | — | V1 OR LESS | — |
| ⑥ | AO2 + α OR MORE | VA1 OR MORE | — | — |

FIG. 8

| | EARLY STAGE OF LAUNCH | MIDDLE STAGE OF LAUNCH | | LATE STAGE OF LAUNCH |
|---|---|---|---|---|
| | | FIRST PHASE | SECOND PHASE | |
| MOTOR OPERATION | TORQUE OUTPUT ACCORDING TO ACCELERATOR OPENING | ← | TORQUE OUTPUT ACCORDING TO ACCELERATOR OPENING AND VEHICLE SPEED, TORQUE DECREASE WITH INCREASING VEHICLE SPEED | DRIVE SUSPENDED |
| ENGINE OPERATION | IDLE RPM | TORQUE OUTPUT ACCORDING TO ELAPSED TIME AND VEHICLE SPEED | TORQUE OUTPUT ACCORDING TO ACCELERATOR OPENING | ← |
| TIMING OF SWITCHING TO NEXT PHASE | VEHICLE SPEED IS V2 OR MORE | AFTER ENGINE RPM REACHES N1, BELT GRIP DETERMINATION TIME PASSES | MOTOR TORQUE IS 0 | |

FIG. 12

HYBRID VEHICLE

CROSS REFERENCE TO RELATED APPLICATION

This present invention claims priority under 35 U.S.C. § 119 to Japanese Patent Application No. 2019-150178 filed on Aug. 20, 2019 and Japanese Patent Application No. 2019-150224 filed on Aug. 20, 2019, the entire contents of both of which are incorporated herein by reference in their entireties including the specifications, claims, drawings, and abstracts.

BACKGROUND

Technical Field

The present disclosure relates to a hybrid vehicle including an engine that drives first wheel, and a motor that drives second wheel separated from the first wheel in a front-rear direction, and in particular, relates to realization of a launch performance that may reflect, if not perfectly, an intention of a driver in accordance with a traveling state when a small motor is used. Further, the present disclosure relates to a hybrid vehicle including an engine that drives first wheel, and a motor that drives second wheel separated from the first wheel in a front-rear direction, and in particular, relates to one or both of realization of comfortable traveling by a driver when the engine is driven, and switching to an appropriate charging mode of a battery.

Related Art

In JP H10-75505 A, a conventional hybrid vehicle is described in which front wheels are driven by an engine, and left and right rear wheels are driven by a pair of left and right motors. In the hybrid vehicle, if an operation amount of an accelerator pedal (acceleration instruction unit) is 0, and an operation amount of a brake pedal is below a predetermined value, the hybrid vehicle is caused to perform creep traveling by the motor. If the operation amount of the accelerator pedal is other than 0, a driving force of the engine is assisted by driving the motor, and the assist by the motor ends as the operation amount of the accelerator pedal increases. As a result, it is possible to minimize the use of a range with poor energy efficiency to contribute to a reduction in fuel consumption.

In a hybrid vehicle in which first wheels are driven by an engine and second wheels are driven by a motor, it is desirable to realize a launch performance that may reflect, if not perfectly, an intention of a driver when a small motor is used, and to improve the energy efficiency and durability of the motor. For example, to launch smoothly in a low-speed range, the hybrid vehicle may be launched by driving only the second wheels driven by the motor, but the continuous use of the small motor in a high-speed range during the launch is not desirable from the viewpoint of improvement in the energy efficiency and durability of the motor. When the driver operates the acceleration instruction unit, if the driver desires a minute speed launch, or a sudden launch in accordance with a traveling state, the hybrid vehicle is desired to comply with these needs.

SUMMARY

An object of the present disclosure is to realize, in a hybrid vehicle in which first wheels are driven by an engine and second wheels are driven by a motor, a launch performance that may reflect, if not perfectly, an intention of a driver in accordance with a traveling state when a small motor is used, and to improve the energy efficiency and durability of the motor. Another object of the present disclosure is, in a hybrid vehicle in which first wheels are driven by an engine and second wheels are driven by a motor, at least one of realization of comfortable traveling by the driver when the engine is driven, and switching to an appropriate charging mode of a battery.

A hybrid vehicle according to the present disclosure includes an engine that drives first wheel, and a motor that drives second wheel separated from the first wheel in a front-rear direction, and includes (1) a minute speed launch support mode in which the hybrid vehicle is driven only by the motor serving as a drive source, (2) a sudden launch support mode in which the hybrid vehicle is driven by the engine and the motor serving as the drive source, and (3) a smooth launch support mode in which the hybrid vehicle is driven only by the motor serving as the drive source in an early stage, is driven by the engine and the motor serving as the drive source in a middle stage, and is driven only by the engine serving as the drive source in a late stage, and if an operation amount of an acceleration instruction unit is not 0 or is substantially not 0, any one of the support modes is executed in accordance with an operation status of the acceleration instruction unit.

BRIEF DESCRIPTION OF DRAWINGS

Embodiment(s) of the present disclosure will be described based on the following figures, wherein:

FIG. 8 is a table showing support mode switching conditions in FIG. 7;

FIG. 12 is a table showing a motor operation, an engine operation, and a timing of switching to a next step in the smooth launch support mode;

DESCRIPTION OF EMBODIMENTS

Figure 1:
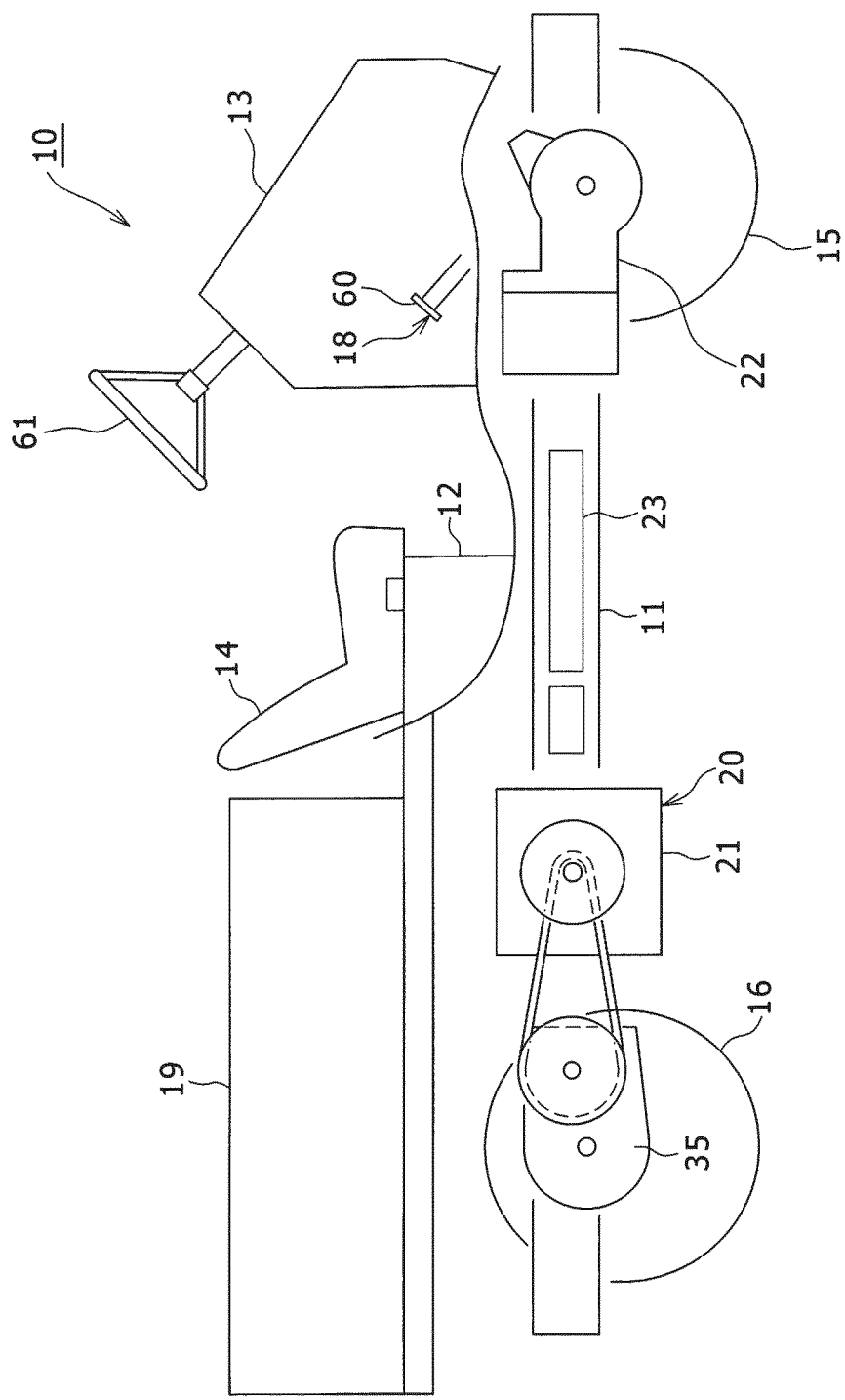
FIG. 1 is a side view illustrating a partial cross section of a hybrid vehicle of an embodiment according to the present disclosure.

An embodiment of the present disclosure will be described below in detail with reference to the drawings. Next, a case will be described where a moving body mounted with a moving body driving unit is an off-road type utility vehicle including a loading platform and traveling on rough terrains such as forests, wastelands, and rocky mountains or an agricultural tractor. However, the moving body may be a work vehicle having a working machine that performs any one or more tasks of snow removal, excavation, civil engineering work, and agricultural work, an all terrain vehicle (ATV), or a recreational vehicle (ROV). In the following description, similar elements are denoted by the same reference numerals in all the drawings.

Figure 2:
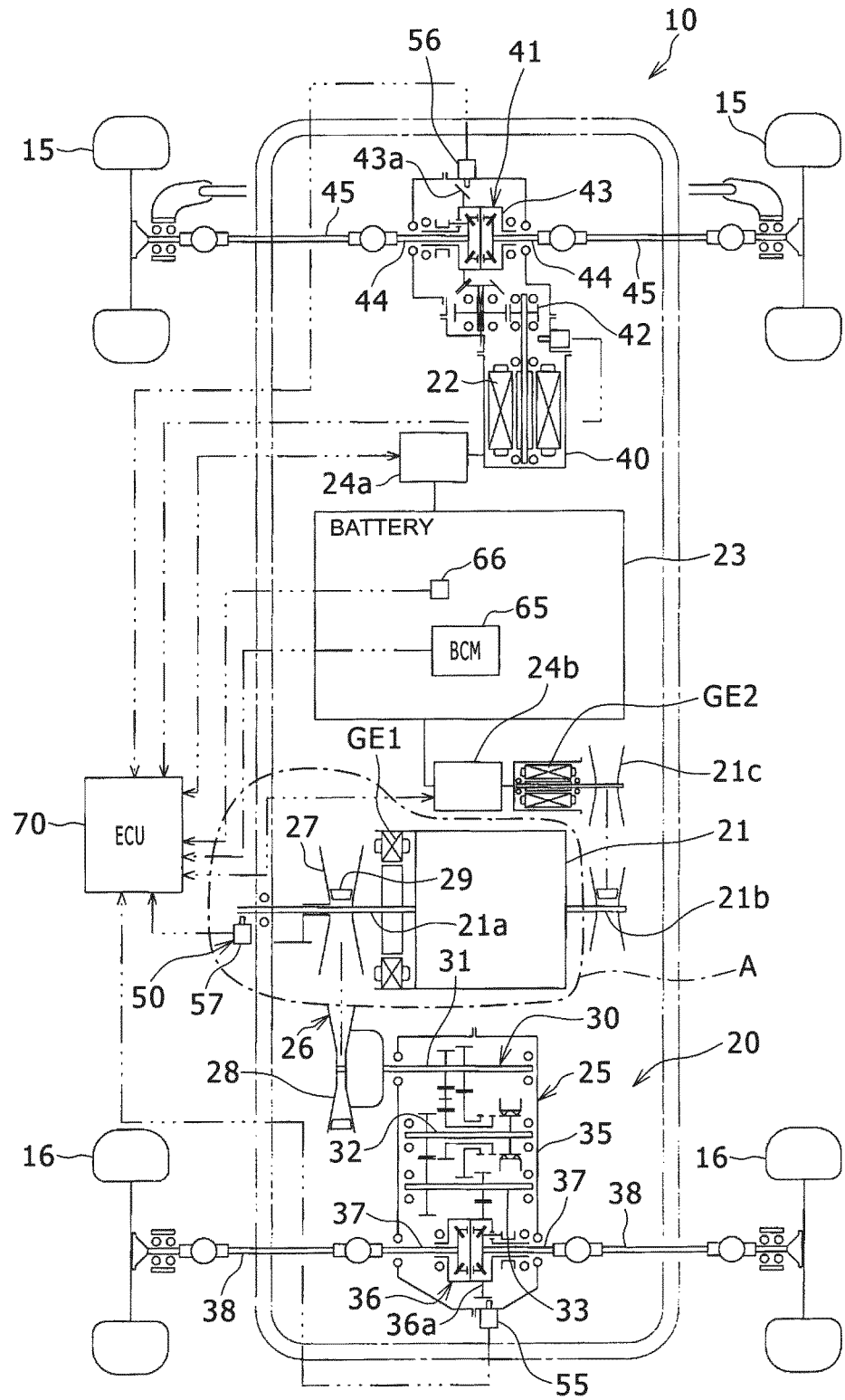
FIG. 2 is a diagram illustrating an overall configuration of a moving body driving unit mounted on the vehicle in FIG. 1.
Figure 3A:
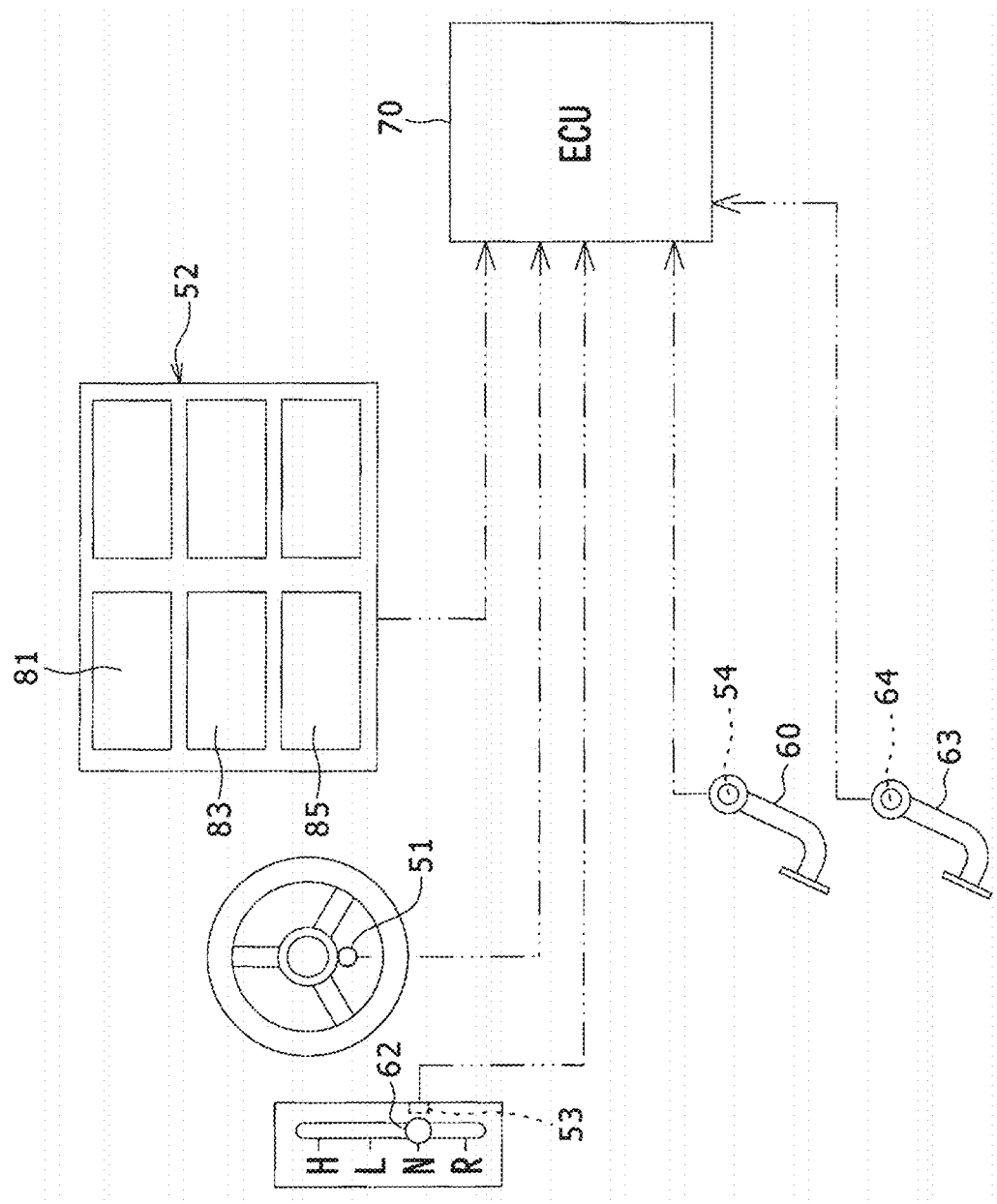
FIG. 3A is a diagram illustrating an operation element group connected to a control device in FIG. 2.
Figure 3B:
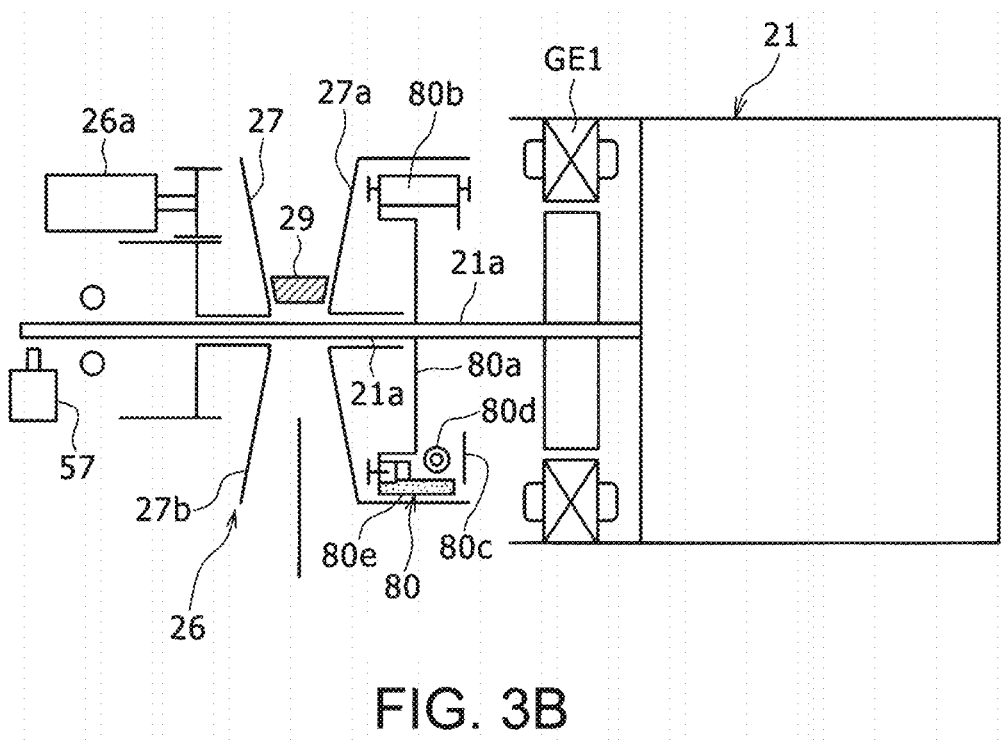
FIG. 3B is an enlarged view of a portion A illustrated in FIG. 2, including a centrifugal clutch.
Figure 4:
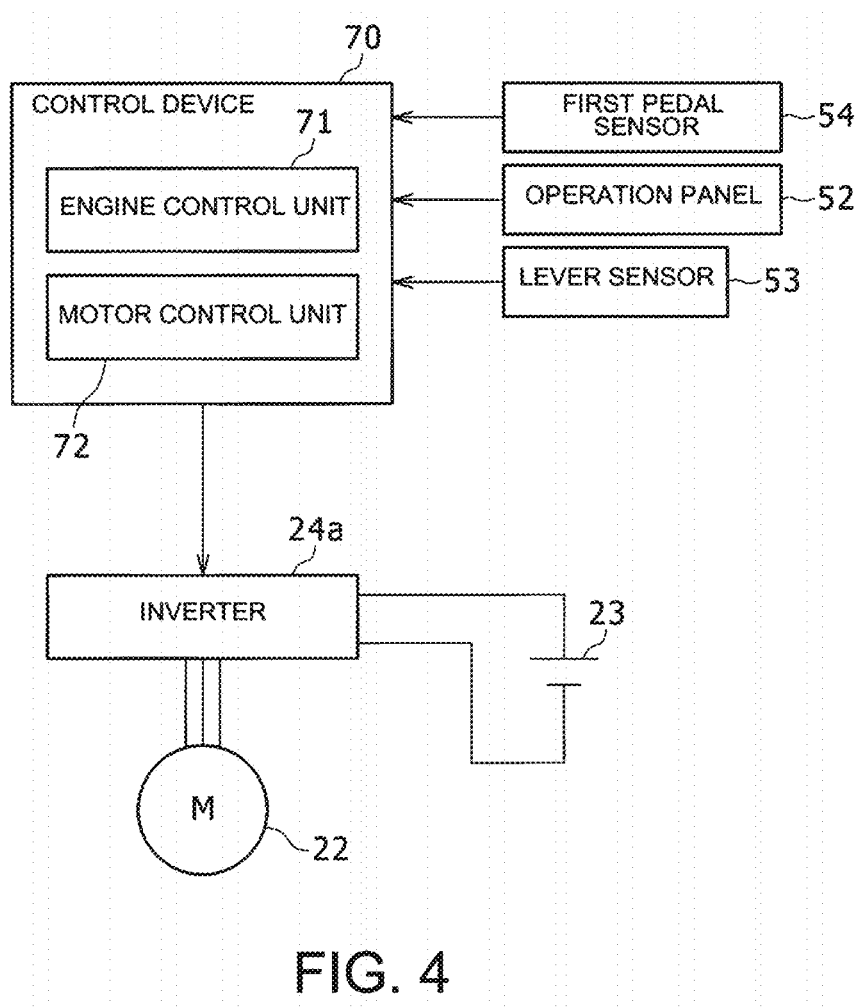
FIG. 4 is a diagram illustrating a configuration of a drive circuit of an electric motor and a control device in the embodiment according to the present disclosure.

FIG. 1 to FIG. 25 illustrate an embodiment. FIG. 1 is a side view illustrating a partial cross section of a hybrid vehicle 10 according to an embodiment. FIG. 2 is a diagram illustrating an overall configuration of a moving body driving unit mounted on the hybrid vehicle 10. FIG. 3A is a diagram illustrating an operation element group connected to a control device in FIG. 2. FIG. 3B is an enlarged view of a portion A illustrated in FIG. 2, including a centrifugal clutch. FIG. 4 is a diagram illustrating a configuration of a drive circuit of an electric motor and a control device.

The hybrid vehicle 10 illustrated in FIG. 1 is an off-road type utility vehicle including a loading platform 19, and includes an engine 21 that drives two left and right rear wheels 16, and a motor 22 that drives two left and right front wheels 15. Hereinafter, the hybrid vehicle 10 may be referred to as the vehicle 10. The motor 22 is an electric motor. The front wheels 15 are separated from the rear wheels 16 in a front-rear direction (in a left-right direction in FIG. 1). The rear wheels 16 correspond to first wheels, and the front wheels 15 correspond to second wheels. Specifically, a platform 12 being a base structure is fixed on a frame 11 included in the vehicle body, and a front cover 13 is fixed on a front side (the right side in FIG. 1) of the frame 11. In the platform 12, a driver's seat 14 is fixed behind the front cover 13, and the loading platform 19 is fixed behind the driver's seat 14. The vehicle 10 includes the two left and right front wheels 15 and the two left and right rear wheels 16 being wheels supported on the front and rear of the frame 11, an operation element group 18, and a moving body driving unit 20. As illustrated in FIG. 1, a battery 23, which will be described later, is arranged below the driver's seat 14 and inside a frame portion at an intermediate portion in the front-rear direction of the frame 11.

The moving body driving unit 20 includes the engine 21 and the motor 22, each of which is a power source, the battery 23 (FIG. 1, FIG. 2) being an electric power source, two generators GE 1 and GE 2 (FIG. 2) for generating electricity to be stored in the battery 23, which are driven by the engine 21, a rear power transmission unit 25 (FIG. 2) and a front power transmission unit 41 (FIG. 2), a sensor switch group 50 (FIG. 2), and a control device 70 (FIG. 2). As illustrated in FIG. 2, the generator GE 1 includes a rotor fixed to an output shaft 21a of the engine 21, and a stator facing the rotor. The generator GE 2 is connected to the engine 21 such that the power of the engine 21 is transmitted via an output shaft 21b extending toward a side opposite to a CVT 26 of the engine 21 and a belt pulley mechanism 21c. The generators GE1 and GE2 are controlled by an inverter 24b and charge the battery 23 with generated electric power. One of the two generators GE 1 and GE 2 may be omitted. A battery monitoring module (BCM) 65 that detects a temperature and a voltage of the battery 23 is attached to the battery 23. The battery monitoring module 65 corresponds to a charge monitoring unit. The battery monitoring module 65 also has a function of detecting a charge amount being a remaining charge amount of the battery 23. A detection signal of a charge amount is transmitted from the battery monitoring module 65 to the control device 70. The vehicle 10 is provided with an inclination angle sensor 66 that detects an inclination angle of a road surface on which the vehicle 10 is, with respect to a horizontal plane. A detection signal of the inclination angle sensor 66 is also transmitted to the control device 70.

The vehicle 10 includes modes of a (1) minute speed launch support mode, a (2) sudden launch support mode, and a (3) smooth launch support mode. In the (1) minute speed launch support mode, the vehicle 10 is driven only by the motor 22 serving as a drive source during launch. In the (2) sudden launch support mode, the vehicle 10 is driven by the engine 21 and the motor 22 serving as a drive source during launch. In the (3) smooth launch support mode, the vehicle 10 is driven only by the motor 22 serving as a drive source in an early stage of launch, is driven by the engine 21 and the motor 22 serving as a drive source in a middle stage, and is driven only by the engine 21 serving as a drive source in a late stage. If an operation amount of an accelerator pedal 60, which will be described later, is not 0, the vehicle 10 is configured to execute any one of the (1) minute speed launch support mode, the (2) sudden launch support mode, and the (3) smooth launch support mode depending on the operation state of the accelerator pedal 60. Even if the operation amount of the accelerator pedal 60 is 0, either the (1) minute speed launch support mode or the (2) sudden launch support mode may be executed. The accelerator pedal 60 corresponds to an acceleration instruction unit. As a result, in the vehicle 10, it is possible to realize a launch performance that may reflect, if not perfectly, an intention of a driver in accordance with a traveling state when the small motor 22 is used, and also to improve the energy efficiency and the durability of the motor 22. If the operation amount of the accelerator pedal 60 is substantially not 0, the vehicle 10 may be configured to execute any one of the (1) minute speed launch support mode, the (2) sudden launch support mode, and the (3) smooth launch support mode depending on the operation state of the accelerator pedal 60.

The vehicle 10 may execute at least one of a (A) regeneration support mode, a (B) slip support mode, a (C) sudden acceleration support mode, and a (D) slope support mode when the engine 21 is driven. In the (A) regeneration support mode, a regenerative brake of the motor 22 is used when the vehicle 10 decelerates on a downhill slope. In the (B) slip support mode, the vehicle 10 is returned from a slip state to a slip-free state by a driving force of the motor 22 when the rear wheels 16 slip. In the (C) sudden acceleration support mode, the vehicle 10 is accelerated by adding a driving force of the motor 22 to a driving force of the engine 21. In the (D) slope support mode, the motor 22 is driven so that a speed of approaching an uphill slope and a speed of passing through an uphill slope are equal. For example, it is possible for the driver to select and instruct any of the (A) regeneration support mode, the (B) slip support mode, the (C) sudden acceleration support mode, and the (D) slope support mode by touching an operation panel 52 described later. As a result, the driver easily realizes comfortable traveling in the vehicle 10 when the engine 21 is driven.

The operation element group 18 includes the accelerator pedal 60 and a brake pedal 63 (FIG. 3A) being a braking instruction unit provided on the front side of the driver's seat 14, a steering operator 61 being a turning instruction unit and a forward-reverse lever 62 (FIG. 3A) provided on the front side of the driver's seat 14, and the operation panel 52.

The steering operator 61 is configured of a steering wheel fixed to a steering shaft protruding obliquely rearward above the front cover 13. The steering operator 61 is coupled to the two left and right front wheels 15 via an Ackermann type steering mechanism to thereby steer the front wheels 15.

As illustrated in FIG. 3A, the forward-reverse lever 62 is configured to switch an operation position among four positions of a low-speed forward position (L position), a high-speed forward position (H position), a neutral position (N position), and a reverse position (R position). The low-speed forward position is a position for selecting a shift stage suitable for low-speed traveling, and the high-speed forward position is a position for selecting a shift stage suitable for high-speed traveling. The forward-reverse lever 62 is supported by the vehicle body to be swingable in the front-rear direction (the vertical direction in FIG. 3A). The forward-reverse lever 62 may be configured to switch an operation position among three positions of a forward position, a neutral position, and a reverse position.

As illustrated in FIG. 1, the engine 21 is fixed below the loading platform 19 behind the driver's seat 14 in the frame 11. The engine 21 is started at an idle RPM by turning on a start switch (not illustrated). Any one of a plurality of types including a gasoline engine and a diesel engine can be employed for the engine 21. The power of the engine 21 is transmitted to the two left and right rear wheels 16 via the rear power transmission unit 25 so that the two rear wheels 16 are driven.

The motor 22 is arranged inside a front case 40 (FIG. 2), described later, that is fixed on the front side of the driver's seat 14 in the frame 11. The battery 23 (FIG. 2) is electrically connected to the motor 22 via an inverter 24a (FIG. 2). The battery 23 may be arranged inside the front cover 13 or below the driver's seat 14 or the loading platform 19. The motor 22 is activated by turning on a start switch (not illustrated) provided on the front side of the driver's seat 14, and by selecting a normal 4WD mode representing a normal four-wheel drive being an instruction for normal driving of the front wheels 15 and the rear wheels 16, or an EV mode, through the operation panel 52 (FIG. 5A), which will be described later.

Various types of motors such as a DC motor, a permanent magnet type motor, an induction motor may be employed for the motor 22. The power of the motor 22 is transmitted to the two left and right front wheels 15 via the front power transmission unit 41 so that the two front wheels 15 are driven. As a result, the motor 22 drives the front wheels 15.

Next, the rear power transmission unit 25 and the front power transmission unit 41 will be described. As illustrated in FIG. 2, the rear power transmission unit 25 includes the CVT 26 being a belt-type continuously variable transmission, a gear transmission 30, a differential device 36, an output shaft 37, and rear axles 38. The rear power transmission unit 25 is coupled to the engine 21 and the rear wheels 16 therebetween so that power can be transmitted from the engine 21 to the rear wheels 16. Therefore, the rear wheels 16 and the engine 21 are coupled via the CVT 26.

The CVT 26 is configured by engaging a driving pulley 27 and a driven pulley 28 around which a belt 29 is wound. The driving pulley 27 includes a first fixed sheave 27a connected to the output shaft 21a of the engine 21 via a centrifugal clutch 80 (FIG. 3B), and a first movable sheave 27b opposed to the first fixed sheave 27a and supported by the output shaft 21a to be movable in an axial direction. The first fixed sheave 27a is only rotatably supported by the output shaft 21a by means of a bearing or the like and does not move in the axial direction.

As illustrated in FIG. 3B, the centrifugal clutch 80 disconnects the connection between the output shaft 21a and the first fixed sheave 27a if an engine RPM being a rotation speed of the engine 21 is less than a belt grip RPM N1 (described later) being a predetermined value. On the other hand, if the engine RPM is equal to or higher than the belt grip RPM N1, the centrifugal clutch 80 connects the output shaft 21a and the first fixed sheave 27a via the centrifugal clutch 80. As a result, the power of the output shaft 21a is transmitted to the first fixed sheave 27a. For example, in the centrifugal clutch 80, one end of a rotary shaft provided at one end of a plurality of clutch weights 80b in a circumferential direction is supported by a clutch plate 80a fixed to the output shaft 21a, and the other end of the rotary shaft of each of the clutch weights 80b is supported by a side plate 80c. The plurality of clutch weights 80b are arranged side by side in the circumferential direction between the clutch plate 80a and the side plate 80c, and are biased radially inward by a spring 80d. A clutch shoe 80e is provided at the other end of the clutch weights 80b in the circumferential direction, and due to radially-outward displacement of the other end of the clutch weights 80b in the circumferential direction by a centrifugal force generated during rotation of the output shaft 21a, the clutch shoe 80e frictionally engages with the inner peripheral surface of the first fixed sheave 27a so that the output shaft 21a and the first fixed sheave 27a rotate integrally.

As illustrated in FIG. 2, the driven pulley 28 includes a second fixed sheave fixed to an input shaft 31 of the gear transmission 30, and a second movable sheave opposed to the second fixed sheave and supported by the input shaft 31 to be movable in an axial direction. The gear transmission 30 corresponds to a wheel-side power transmission unit. The first movable sheave 27b (FIG. 3B) of the driving pulley 27 is moved in the axial direction by an actuator 26a (FIG. 3B) including a motor. The second movable sheave of the driven pulley 28 is elastically biased by a spring (not illustrated) to approach the second fixed sheave. The actuator 26a brings the first movable sheave 27b of the driving pulley 27 closer to the first fixed sheave 27a as a rotation speed of the engine 21 increases. As a result, if the rotation speed of the engine 21 is low, a width between the first movable sheave 27b and the first fixed sheave 27a (an inter-sheave width) increases as illustrated in FIG. 2. Therefore, the CVT 26 is continuously varied, and the ratio (Na/Nb) of a rotation speed Na of the driving pulley 27 and a rotation speed Nb of the driven pulley 28, in which the ratio (Na/Nb) is the reduction ratio of the CVT 26, increases. Conversely, if the rotation speed of the engine 21 increases, the inter-sheave width of the driving pulley 27 decreases, and consequently the CVT 26 is continuously varied and the reduction ratio (Na/Nb) of the CVT 26 decreases. As a result, it is possible to increase a torque of the input shaft 31 during low-speed traveling, and fuel consumption can be improved during high-speed traveling.

The gear transmission 30 includes a rear case 35 fixed behind the engine 21 on the frame 11, the input shaft 31, a transmission shaft 32, and a final shaft 33, which are rotatably arranged in the rear case 35. The gear transmission 30 enables transmission of power from the input shaft 31 to the final shaft 33 via a gear mechanism and a slide gear provided around the transmission shaft. The slide gear is coupled to the forward-reverse lever 62. In response to an operation of the forward-reverse lever 62, the slide gear moves in the axial direction and a gear to be engaged is switched, whereby a relationship between a rotation direction of the input shaft 31 and a rotation direction of the final shaft 33 switches. The power transmitted to the final shaft 33 is transmitted to a transmission gear 36a of the differential device 36 via the gear mechanism. Two left and right output shafts 37 are differentially coupled to the differential device 36. The differential device 36 is arranged inside the rear case 35. The rear wheels 16 are coupled to the output shafts 37 via universal joints and the rear axles 38. As a result, the rear wheels 16 are driven by the engine 21.

If the forward position is selected through the forward-reverse lever 62 (FIG. 3A), the vehicle 10 can be moved forward. If the reverse position is selected by the forward-reverse lever 62, the vehicle 10 can be moved rearward. If the neutral position is selected through the forward-reverse lever 62, the inter-sheave width of the driving pulley 27 increases, and consequently the power transmission between the output shaft 21a of the engine 21 and the belt 29 of the CVT 26 is blocked.

As illustrated in FIG. 2, the front power transmission unit 41 includes a gear mechanism 42, a differential device 43, an output shaft 44, and front axles 45. The front power transmission unit 41 is coupled to the motor 22 and the front wheel 15 therebetween so that power can be transmitted from the motor 22 to the front wheels 15. The power of the rotary shaft of the motor 22 is transmitted to a transmission gear 43a of the differential device 43 via the gear mechanism 42. Two left and right output shafts 44 are differentially coupled to the differential device 43. The front wheels 15 are coupled to the output shaft 44 via universal joints and the front axles 45. The motor 22, the gear mechanism 42, and the differential device 43 are arranged inside the front case 40. The front case 40 is fixed on the front side of the frame 11 (FIG. 1). As a result, the front wheels 15 are driven by the motor 22.

As illustrated in FIG. 2 and FIG. 3A, the sensor switch group 50 includes a steering sensor 51, a lever sensor 53, a first pedal sensor 54, a second pedal sensor 64, a rear axle speed sensor 55, a front axle speed sensor 56, and an engine speed sensor 57.

The steering sensor 51 detects an operation angle of the steering operator 61 and transmits the detection signal to the control device 70 described later. The steering sensor 51 may be omitted.

The lever sensor 53 detects a position of the forward-reverse lever 62, and transmits the detection signal to the control device 70 described later. Upon determining from the detection signal of the lever sensor 53 that the forward-reverse lever 62 is in the neutral position, the control device 70 may move the first movable sheave 27b of the driving pulley 27 significantly away from the first fixed sheave 27a, and perform control so that the power of the driving pulley 27 is not transmitted to the belt 29 due to deflection of the belt 29.

The first pedal sensor 54 detects an operation amount of the accelerator pedal 60 as an accelerator opening, and transmits the detection signal to the control device 70. The accelerator opening is equivalent to an accelerator operation amount, and represents the ratio of an accelerator pedal stepping-on amount with respect to a fully opened state, with the fully opened state being 100% when the accelerator pedal is fully stepped on. The control device 70 includes an engine control unit 71 (FIG. 4). The engine control unit 71 controls a throttle valve so that an opening of the throttle valve (not illustrated) of the engine 21 increases as an accelerator opening corresponding to an operation amount of the accelerator pedal 60 increases. A valve drive motor controlled by the engine control unit 71 may be provided to drive the throttle valve. The opening of the throttle valve changes according to driving of the valve drive motor. The rotation speed of the engine 21 is adjusted by the opening of the throttle valve, and the rotation speed of the engine 21 increases as the opening of the throttle valve increases. The meaning of the "rotation speed" also includes the number of rotations being a rotation speed per unit time, such as per minute.

A driving unit of the throttle valve may be coupled to the accelerator pedal 60 via a link or a cable, and the opening of the throttle valve may be increased as the operation amount of the accelerator pedal 60 increases. In this case, the first pedal sensor 54 does not directly detect a pedal position of the accelerator pedal 60, but is provided near the throttle valve to detect an opening degree of the throttle valve, so that the pedal position of the accelerator pedal 60 may be indirectly detected.

The brake pedal 63 is coupled to a hydraulic pressure generating mechanism (not illustrated) via a link. A brake disc (not illustrated) is fixed to one or both of the front wheels 15 and the rear wheels 16, and two brake pads (not illustrated) inside and outside the vehicle are arranged on both sides of the brake disc. The hydraulic pressure generating mechanism applies a hydraulic pressure to one of the two brake pads to generate a braking force that sandwiches the brake disc.

Figure 5A:
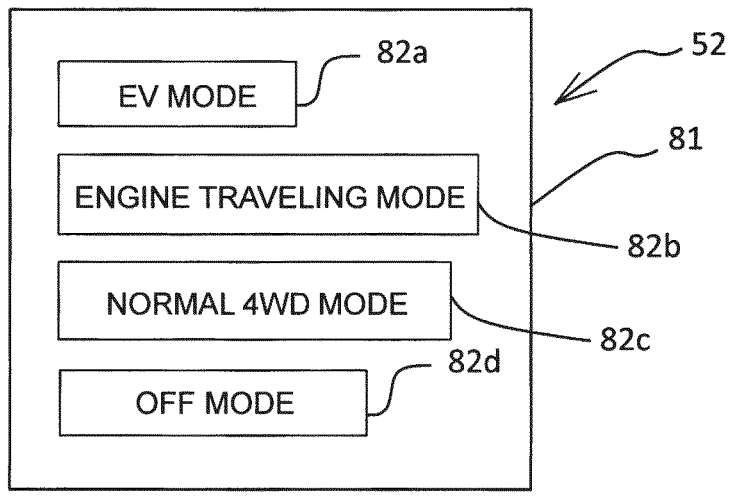
FIG. 5A is a diagram illustrating a first display area having a plurality of travel mode selection units on an operation panel in FIG. 3.

A signal from the operation panel 52 (FIG. 3A) is also input to the control device 70 (FIG. 2). The operation panel 52 is provided, for example, on the driver's seat 14 side of the front cover 13 to be operable by the driver, and is operated to instruct a drive mode of the vehicle 10. The operation panel 52 is, for example, a touch panel type display, and includes six display areas including first, second, and third display areas 81, 83, and 85. FIG. 5A is a diagram illustrating the first display area 81 having a plurality of travel mode selection units on the operation panel 52. The plurality of travel mode selection units include an EV mode selection unit 82a, an engine traveling mode selection unit 82b, a normal 4WD mode selection unit 82c, and an OFF mode selection unit 82d. The "EV mode" is a mode in which the engine 21 is always stopped and the vehicle travels by using only the motor 22 serving as a drive source of the vehicle, and a signal representing an instruction of the EV mode is transmitted to the control device 70 by the driver touching the EV mode selection unit 82a. The "engine traveling mode" is a mode in which the motor 22 is always stopped and the vehicle travels by using only the engine 21 serving as a drive source of the vehicle, and a signal representing an instruction of the engine traveling mode is transmitted to the control device 70 by the driver touching the engine traveling mode selection unit 82b. The "normal 4WD mode" is a mode in which four-wheel-drive traveling is allowed by using both the engine 21 and the motor 22 serving as a drive source of the vehicle at all times, and a signal representing an instruction of the normal 4WD mode is transmitted to the control device 70 by the driver touching the normal 4WD mode selection unit 82c. The "OFF mode" is a mode in which any one of the EV mode, the engine traveling mode, and the normal 4WD mode is not fixedly selected at all times, and a signal representing an instruction of the OFF mode is transmitted to the control device 70 by the driver touching the OFF mode selection unit 82d. For example, the OFF mode is selected before any one of support modes in FIG. 5B described later is selected. Settings may be made so that the OFF mode is automatically selected by the control device 70 if any one of the support modes is selected.

The vehicle 10 may include a drive changeover switch or a drive changeover lever capable of switching among the EV mode, the engine traveling mode, the normal 4WD mode, and the OFF mode, and as a result of such switching, a signal representing an instruction of the corresponding mode may be transmitted to the control device 70.

The control device 70 includes a motor control unit 72 (FIG. 4). The motor control unit 72 controls the motor 22 so that the rotation speed of the motor 22 increases as the operation amount of the accelerator pedal 60 increases in a state where the EV mode or the normal 4WD mode is instructed.

When the normal 4WD mode is executed, electric power equivalent to the generated output of the motor 22 may be generated by the generators GE1 and GE2 as a result of driving of the engine 21. For example, the sum of an electric power generation torque being a torque with which the generators GE1 and GE2 generate electric power is a torque equivalent to the output of the motor 22, and may be represented as (output of the motor 22)×60/(2π×engine rotation speed). As a result, four-wheel drive traveling is allowed while a decrease in charge amount in the battery 23 is suppressed.

The rear axle speed sensor 55 detects a rotation speed of the transmission gear 36a (FIG. 2) of the differential device 36. The transmission gear 36a is fixed to a rear differential case of the differential device 36. The rear differential case rotates at an average rotation speed of the two left and right rear axles 38. Thereby, the rear axle speed sensor 55 can detect an average rotation speed of the two left and right rear axles 38. The detection signal of the rear axle speed sensor 55 is input to the control device 70 as the rear wheel rotation speed.

The front axle speed sensor 56 detects a rotation speed of the transmission gear 43a (FIG. 2) of the differential device 43. The transmission gear 43a is fixed to a front differential case of the differential device 43. The front differential case rotates at an average rotation speed of the two left and right front axles 45. Thereby, the front axle speed sensor 56 can detect an average rotation speed of the two left and right front axles 45. The detection signal of the front axle speed sensor 56 is input to the control device 70 as the front wheel rotation speed. A vehicle speed calculated from the rear wheel rotation speed or the front wheel rotation speed, or an average value of both the rotation speeds can be employed for the vehicle speed detection value described later.

The engine speed sensor 57 detects an engine RPM as a rotation speed of the output shaft 21a of the engine 21, and transmits the detection signal to the control device 70. The control device 70 controls the actuator 26a to move the first movable sheave 27b (FIG. 3B) of the driving pulley 27 of the CVT 26 according to the detection value of the engine speed sensor 57.

Although a case where the CVT 26 includes the actuator 26a having a motor to be operated electrically is described above, the CVT may be hydraulic type in which the movable sheave is moved by a hydraulic device, or may be mechanical type in which the movable sheave is moved by a pressing force generating mechanism including a torque cam.

The control device 70 is called an electronic control unit (ECU), is configured of, for example, a microcomputer, and includes a CPU being an arithmetic processing unit, a storage unit including a memory such as a RAM and a ROM, and an input/output port. The CPU has a function of reading and executing a control program stored in the storage unit in advance. Generally, the function of each means of the control device 70 is realized by executing a control program. The control device 70 includes the above-described engine control unit 71 (FIG. 4) that controls the engine 21, and the motor control unit 72 (FIG. 4) that controls the motor 22.

As illustrated in FIG. 4, the battery 23 is connected to the motor 22 via the inverter 24a. The inverter 24a converts a direct current output from the battery 23 into an alternating current being a drive current of the motor 22.

The motor control unit 72 controls drive of the motor 22 by controlling the inverter 24a in a state where the EV mode or the normal 4WD mode is instructed. If determining that the forward position is selected by the forward-reverse lever 62 (FIG. 3A), based on the detection signal from the lever sensor 53, and that the accelerator pedal 60 (FIG. 3A) is operated based on the detection signal from the first pedal sensor 54, the motor control unit 72 performs control to rotate the motor 22 in a direction corresponding to the forward movement. At this time, the drive current is supplied from the battery 23 to the motor 22.

On the other hand, if determining that the neutral position is selected by the forward-reverse lever 62, the motor control unit 72 stops the current supply from the battery 23 to the motor 22.

The motor control unit 72, when the EV mode or the normal 4WD mode is instructed, controls the motor 22 to match the rotation speed of the front wheels 15 with the rotation speed of the rear wheels 16, based on the detection signals of the rear axle speed sensor 55 and the front axle speed sensor 56 (FIG. 2).

The control device 70 controls the actuator 26a to change the inter-sheave width of the driving pulley 27 of the CVT 26 according to the rotation speed of the engine 21. The centrifugal clutch 80 (FIG. 3B) connected to the CVT 26 disconnects the output shaft 21a from the driving pulley 27 if the rotation speed of the engine 21 is lower than a predetermined speed, and if the rotation speed of the engine 21 is equal to higher than the predetermined speed, the output shaft 21a and the driving pulley 27 are connected via the centrifugal clutch 80. The predetermined speed is higher than the speed equivalent to the idle RPM. As a result, if the engine 21 is rotating at the idle RPM while the accelerator pedal 60 is not stepped on, the power of the engine 21 is not transmitted to the driving pulley 27.

The control device 70 also has a function of executing any one of the minute speed launch support mode, the sudden launch support mode, and the smooth launch support mode in accordance with selection of a launch support selection unit 84a (FIG. 5B) in the plurality of support selection units described later.

Figure 5B:
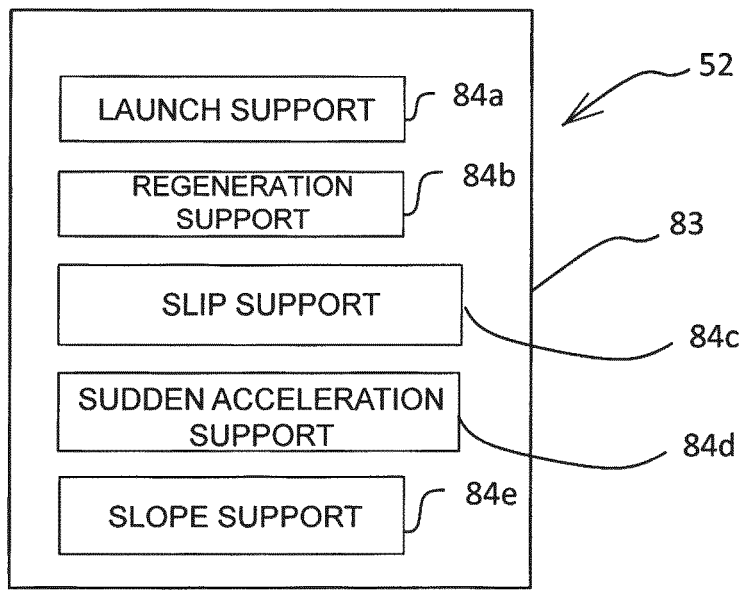
FIG. 5B is a diagram illustrating a second display area having a plurality of support selection units on the operation panel in FIG. 3.

FIG. 5B is a diagram illustrating the second display area 83 having a plurality of support selection units on the operation panel 52. The plurality of support selection units include the launch support selection unit 84a, a regeneration support selection unit 84b, a slip support selection unit 84c, a sudden acceleration support selection unit 84d, and a slope support selection unit 84e. If the launch support selection unit 84a is selected by being touched, the minute speed launch support mode, the sudden launch support mode, and the smooth launch support mode are switched based on an operation status of the accelerator pedal 60 (FIG. 3A), the vehicle speed detection value, and an engine RPM detection value. This switching will be described later in detail.

If any one of the regeneration support selection unit 84b, the slip support selection unit 84c, the sudden acceleration support selection unit 84d, and the slope support selection unit 84e is selected by being touched, a signal representing an instruction of the selected support mode is transmitted to the control device 70. The control device 70 executes the corresponding support mode in response to the input of the signal. The vehicle 10 may execute each of the regeneration support mode, the slip support mode, the sudden acceleration support mode, and the slope support mode when the engine 21 is driven and the vehicle 10 travels.

Figure 5C:
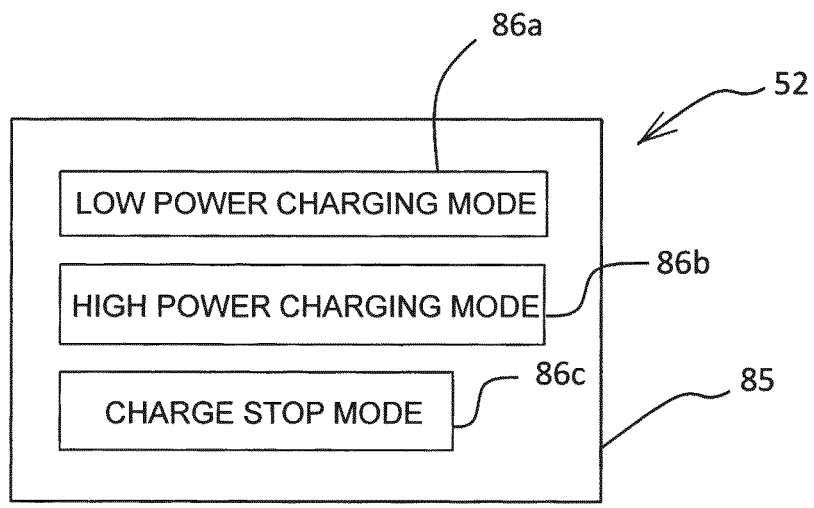
FIG. 5C is a diagram illustrating a third display area having a plurality of charging mode selection units on the operation panel in FIG. 3.

FIG. 5C is a diagram illustrating the third display area 85 including a plurality of charging mode selection units on the operation panel 52. The plurality of charging mode selection units include a low power charging mode selection unit 86a, a high power charging mode selection unit 86b, and a charge stop mode selection unit 86c. Both a low power charging mode and a high power charging mode are modes for charging the battery 23. The high power charging mode is a mode in which the charging speed of the battery 23 is higher than that of the low power charging mode. A charge stop mode is a mode in which charging of the battery 23 is stopped. If any one of the low power charging mode selection unit 86a, the high power charging mode selection unit 86b, and the charge stop mode selection unit 86c is selected by being touched, a signal representing an instruction of the selected mode is transmitted to the control device 70. The vehicle 10 may execute either the low power charging mode or the high power charging mode while stopped, when the engine 21 is driven. More specifically, the vehicle 10 is configured to switch among the low power charging mode, the high power charging mode, and the charge stop mode.

Figure 6:
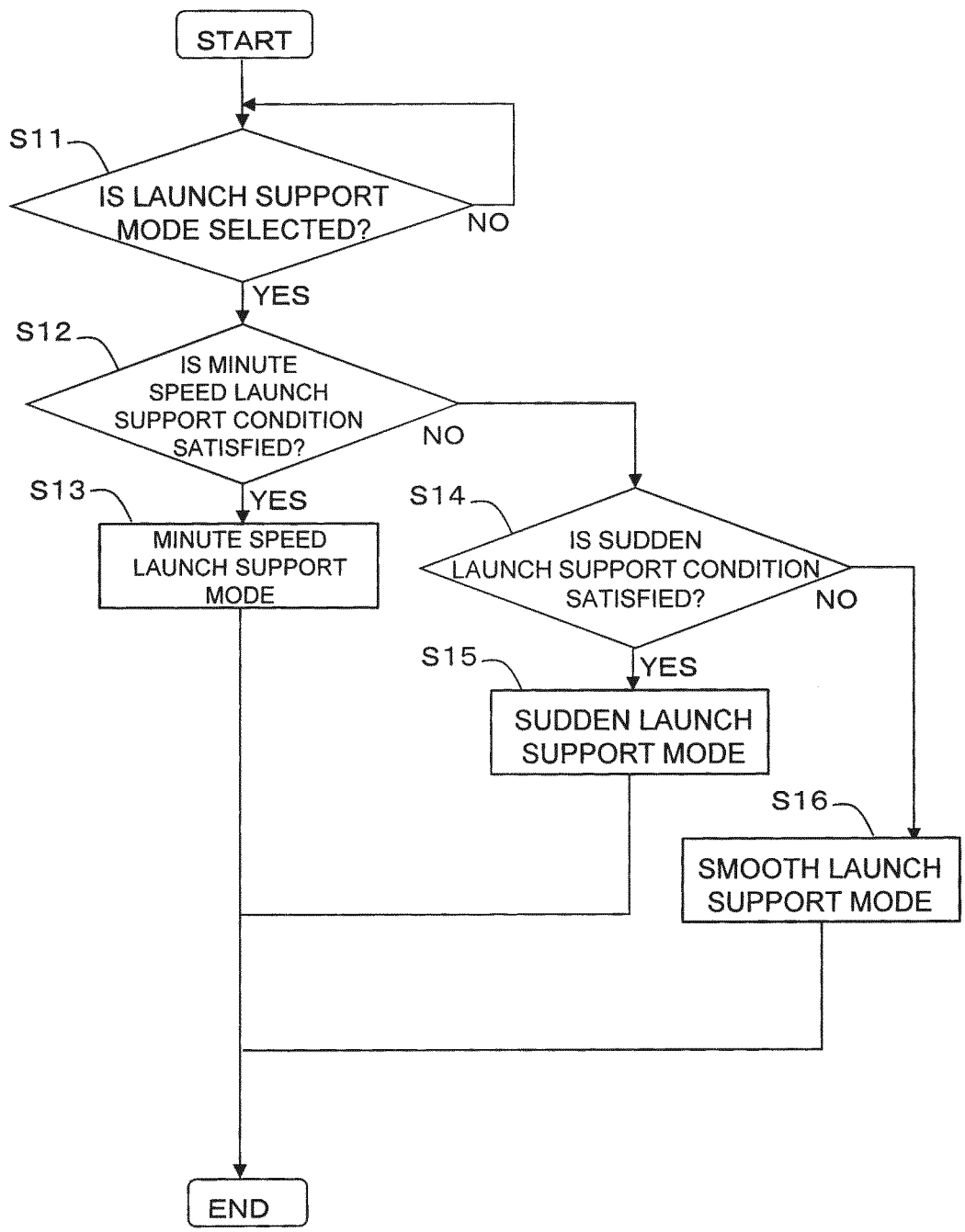
FIG. 6 is a flowchart illustrating a control method during a launch support selection in the embodiment according to the present disclosure.

Next, a control method when a launch support mode is selected will be described. FIG. 6 is a flowchart illustrating the control method when the launch support mode is selected in the embodiment. The following description will be given using the reference numerals in FIG. 1 to FIG. 5C as appropriate. The processing of steps S11 to S16 is executed by the control device 70. In step S11, a determination is made as to whether a launch support mode is selected by the driver touching the operation panel 52. If YES is determined in step S11, the processing proceeds to step S12. If NO is determined in step S11, the processing of step S11 is repeated.

In step S12, a determination is made as to whether a minute speed launch support condition is satisfied. For example, it is determined that the minute speed launch support condition is satisfied if the vehicle speed detection value is equal to or less than a minute speed launch maximum vehicle speed V1, which is a predetermined speed, and the detected accelerator opening is less than a first predetermined value. For example, it is determined that the minute speed launch support condition is satisfied if the accelerator opening is equal to or less than (a predetermined minute speed launch maximum opening AO1−α). At this time, α is a predetermined margin amount other than 0, for example. The minute speed launch maximum opening AO1 is a first predetermined value. If YES is determined in step S12, the "minute speed launch support" mode is executed in step S13.

If NO is determined in step S12, in step S14 a determination is made as to whether a sudden launch support condition is satisfied. For example, it is determined that the sudden launch support condition is satisfied if a change speed being a time change rate of the detected accelerator opening is equal to or higher than a predetermined sudden launch determination change speed VA1, and the detected accelerator opening is equal to or more than (a predetermined sudden launch determination opening AO2+α). The sudden launch determination change speed VA1 corresponds to a predetermined time change rate. The sudden launch determination opening A02 is a second predetermined value larger than the first predetermined value. If YES is determined in step S14, the "sudden launch support" mode is executed in step S15.

If NO is determined in step S14, the "smooth launch support" mode being the remaining launch support mode is executed in step S16. Each of the launch support modes described above may be executed if the accelerator pedal 60 is continuously depressed.

Figure 7:
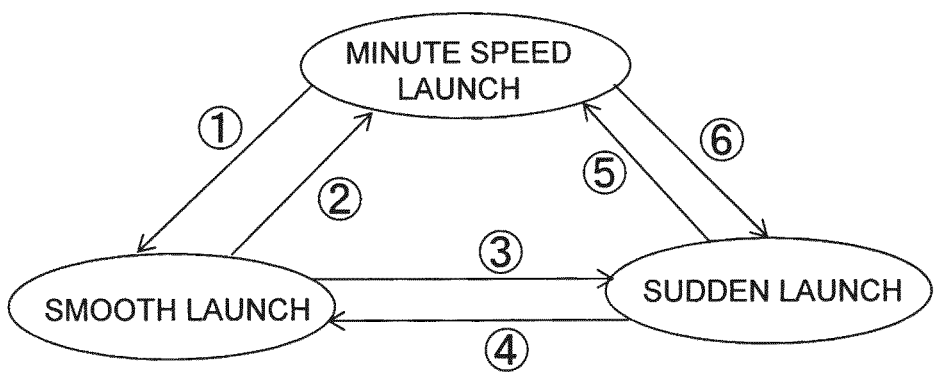
FIG. 7 is a diagram illustrating a plurality of examples in which a minute speed launch support mode, a sudden launch support mode, and a smooth launch support mode are switched when a launch support mode is selected in the embodiment according to the present disclosure.

If a launch support mode is selected on the operation panel 52, the launch support mode may be switched by the processing illustrated in FIG. 7 and FIG. 8. FIG. 7 is a diagram illustrating a plurality of examples in which a minute speed launch support mode, a sudden launch support mode, and a smooth launch support mode are switched when a launch support mode is selected in the embodiment. FIG. 8 is a table showing support switching conditions in FIG. 7.

In the example illustrated and shown in FIG. 7 and FIG. 8, if the condition corresponding to the number of an arrow is satisfied, the minute speed launch support mode, the sudden launch support mode, and the smooth launch support mode are switched from the current or previous support mode. The number of an arrow in FIG. 7 corresponds to the row number in the table in FIG. 8. For example, the switch from the minute speed launch support mode to the smooth launch support mode is executed if the detected accelerator opening is equal to or more than (the minute speed launch maximum opening A1+α) as shown in column 1 in FIG. 8.

As shown in rows 2 and 5 of FIG. 8, the switch to the minute speed launch support mode is executed if the vehicle speed detection value is equal to or lower than the minute speed launch maximum vehicle speed V1, and the detected accelerator opening is equal to or less than (the minute speed launch maximum opening AO1−α).

As shown in rows 3 and 6 of FIG. 8, the switch to the sudden launch support mode is executed if the change speed of the detected accelerator opening is equal to or higher than the sudden launch determination change speed VA1, and the accelerator opening is equal to or more than (the sudden launch determination opening AO2+α).

As shown in row 4 of FIG. 8, the switch from the sudden launch support mode to the smooth launch support mode is executed if the detected accelerator opening is equal to or less than (the sudden launch determination opening AO2−α), the vehicle speed detection value is equal to or lower than a predetermined engine drive start vehicle speed V2, and the engine RPM detection value is equal to or lower than a predetermined belt grip RPM N1. The engine drive start vehicle speed V2 is a vehicle speed at which the vehicle switches from traveling by driving only the motor 22 in the smooth launch support mode to traveling by driving both the motor 22 and the engine 21. The belt grip RPM N1 is an engine RPM obtained when the number of rotations of the engine 21 increases, the centrifugal clutch 80 is connected, and transmission of the driving force of the engine 21 to the belt 29 of the CVT 26 starts.

Figure 9:
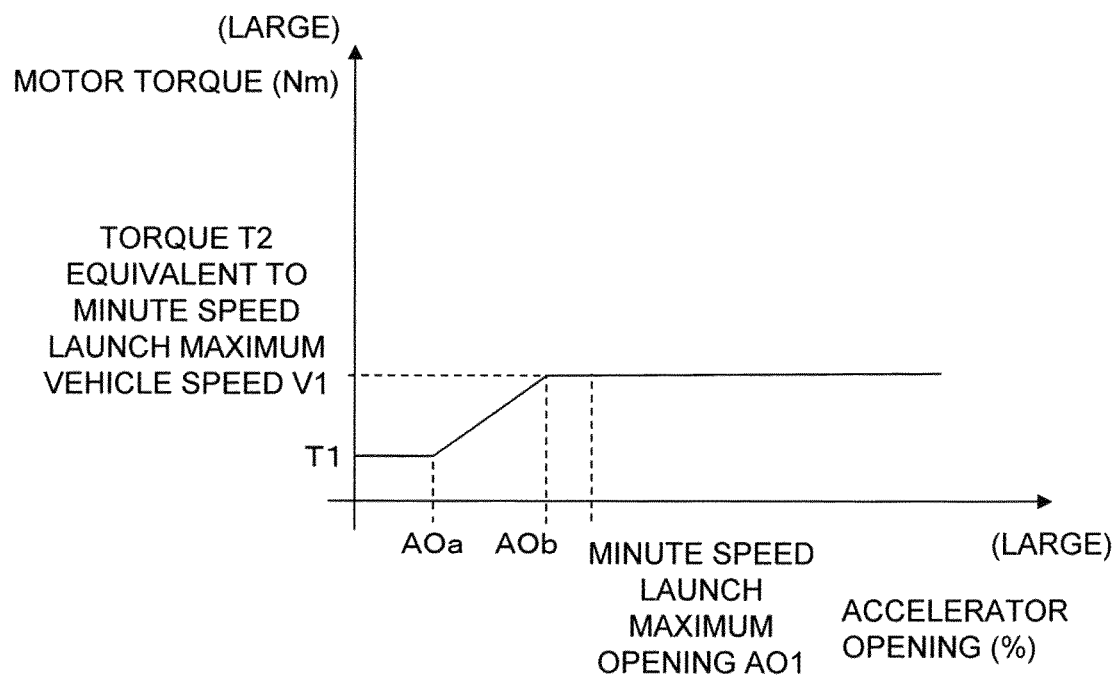
FIG. 9 is a graph illustrating a relationship between an accelerator opening and a motor torque in the minute speed launch support mode.

A method for executing the minute speed launch support mode will be described with reference to FIG. 9. FIG. 9 is a graph illustrating a relationship between an accelerator opening and a motor torque in the minute speed launch support mode. The minute speed launch support mode performs control so that the vehicle is driven only by the motor 22 serving as a drive source. When the minute speed launch support mode is executed, the drive of the motor 22 is controlled using the relationship in FIG. 9. The minute speed launch support mode can also be executed when the accelerator opening is 0. The relationship between the torque of the motor 22 and the accelerator opening at the time of execution of the minute speed launch support mode is a relationship in which a predetermined torque T1 is generated when the accelerator opening is 0. The torque T1 is maintained if the accelerator opening is from 0 to AOa, and the motor torque increases linearly if the accelerator opening is from AOa to AOb. At the accelerator opening AOb, the motor torque is a torque T2 equivalent to the minute speed launch maximum vehicle speed V1 in terms of traveling on a flat surface, and the torque is maintained even if the accelerator opening is further increased. The minute speed launch maximum vehicle speed V1 may be empirically set to an optimum vehicle speed, based on, for example, actual driving of the vehicle, or the like. In addition, if a vehicle driving force obtained from vehicle conditions such as a motor torque, a wheel radius, and a reduction ratio matches a traveling resistance of the vehicle that fluctuates depending on a vehicle speed, an inclination (gradient) of a road surface, and the like, a constant maximum vehicle speed is obtained. As a result, the torque T2 of the motor 22 for obtaining the minute speed launch maximum vehicle speed V1 during traveling on a flat surface can be calculated from the vehicle speed V1, the vehicle conditions, and the like.

In the minute speed launch support mode, an engine torque is an idle torque at an idle RPM, and the inverter 24b connected to the generators GE1 and GE2 is controlled so that a generated torque of the generators GE1 and GE2 is 0. As a result of the minute speed launch support mode described above, it is possible to smoothly launch the vehicle in the low-speed range.

Figure 10:
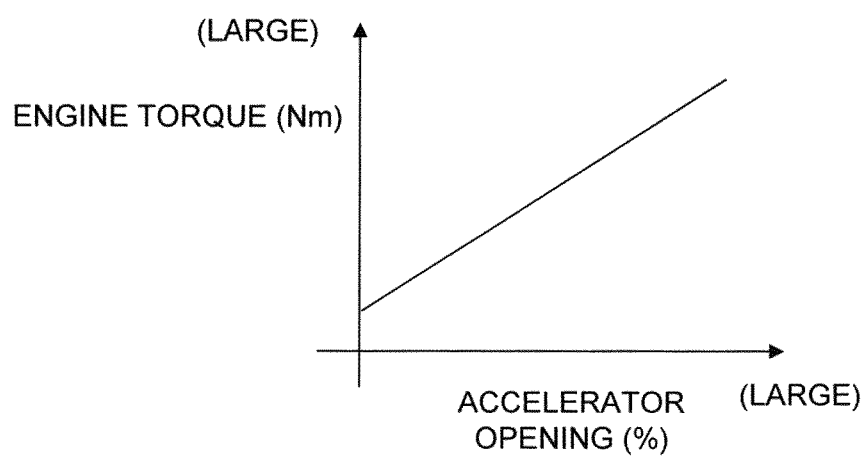
FIG. 10 is a graph illustrating a relationship between an accelerator opening and an engine torque in the sudden launch support mode.
Figure 11:
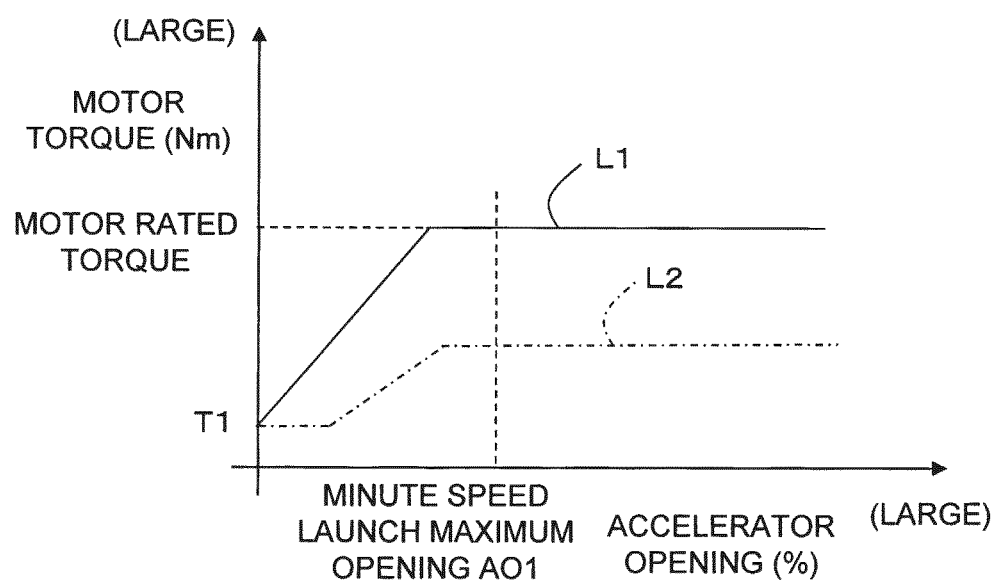
FIG. 11 is a graph illustrating a relationship between an accelerator opening and a motor torque in the sudden launch support mode.

A method for executing the sudden launch support mode will be described with reference to FIG. 10 and FIG. 11. FIG. 10 is a graph illustrating a relationship between an accelerator opening and an engine torque in the sudden launch support mode. FIG. 11 is a graph illustrating a relationship between an accelerator opening and a motor torque in the sudden launch support mode. The sudden launch support mode performs control so that the vehicle is driven by the engine 21 and the motor 22 serving as drive sources. When the sudden launch support mode is executed, the drive of the engine 21 is controlled using the relationship in FIG. 10. If the accelerator opening is 0, the engine 21 generates an idle torque at an idle RPM. The engine torque increases linearly as the accelerator opening increases.

When the sudden launch support mode is executed, the drive of the motor 22 is controlled using the relationship in FIG. 11. The solid line L1 in FIG. 11 indicates a motor torque when the sudden launch support mode is executed, and the dash-dot-dash line L2 in FIG. 11 indicates a motor torque when the minute speed launch support mode is executed. A relationship between a torque of the motor 22 and an accelerator opening at the time of execution of the sudden launch support mode is a relationship in which a predetermined torque T1 is generated when the accelerator opening is 0. As the accelerator opening increases from 0, the motor torque increases linearly until the motor rated torque is reached, and thereafter, the motor torque is maintained at the motor rated torque. When the sudden launch support mode is executed, until the motor rated torque is reached, a degree by which the motor torque increases in accordance with an increase in the accelerator opening is greater than a degree by which the motor torque increases in accordance with an increase in the accelerator opening when the minute speed launch support mode is executed. As a result, a torque that increases sharply can be obtained only with the motor 22 as compared with the case of the minute speed launch mode. The torque of the engine 21 is added to the torque of the motor 22 to drive the vehicle, and consequently it is possible to realize a sudden launch.

Figure 13:
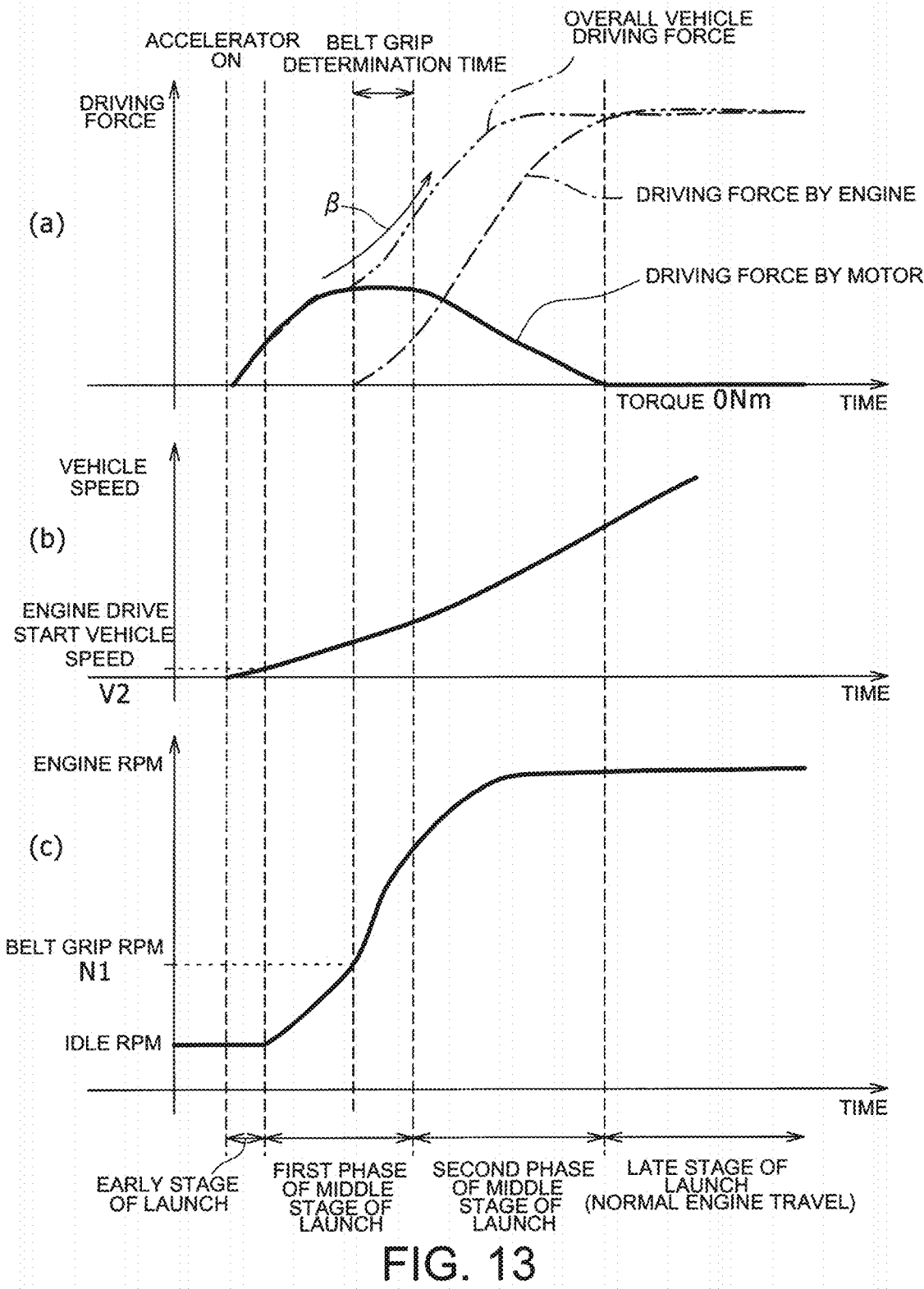
FIG. 13 is a set of graphs illustrating a vehicle driving force, a vehicle speed, and rotations per minute (RPM) of an engine over time when an accelerator opening is constant in the smooth launch support mode.

A method for executing the smooth launch support mode will be described with reference to FIG. 12 to FIG. 16. FIG. 12 is a table showing a motor operation, an engine operation, and a timing of switching to a next step in the smooth launch support mode. FIG. 13 is a set of graphs illustrating a vehicle driving force, a vehicle speed, and an engine RPM over time when an accelerator opening is constant in the smooth launch support mode. In (a) of FIG. 13, the overall vehicle driving force is the sum of the driving force by the motor 22 and the driving force by the engine 21.

The smooth launch support mode performs control to drive the vehicle 10 only by the motor 22 serving as a drive source in an early stage of launch, drive the vehicle 10 by the engine 21 and the motor 22 serving as drive sources in a middle stage, and drive the vehicle 10 only by the engine 21 serving as a drive source in a late stage. The smooth launch support mode can be executed, for example, when the accelerator opening is constant. The smooth launch support mode realizes driving in the early stage, driving in the middle stage, and driving in the late stage when the accelerator pedal 60 is continuously depressed. Therefore, if the accelerator pedal 60 is turned off while the smooth launch support mode is being executed, the execution stops in any of the early stage, the middle stage, and the late stage.

Figure 14:
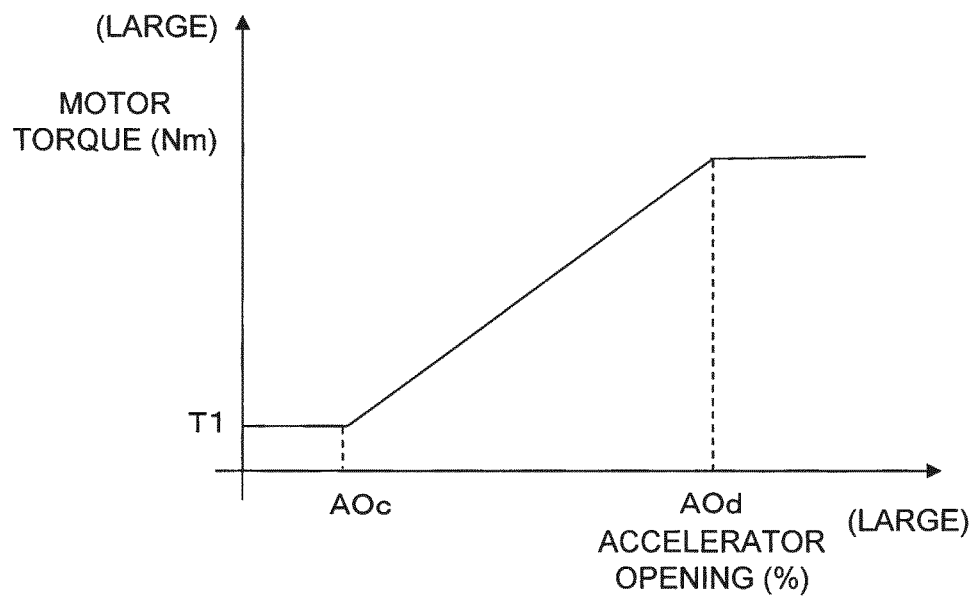
FIG. 14 is a graph illustrating a relationship between an accelerator opening and a motor torque in an early stage of launch in the smooth launch support mode.

As shown and illustrated in FIG. 12 and FIG. 13, during the execution of the smooth launch support mode, the control device 70 outputs the motor torque in accordance with a detected increase in the accelerator opening in the early stage of launch when the accelerator pedal 60 is turned on. FIG. 14 is a graph illustrating a relationship between an accelerator opening and a motor torque in the early stage of launch in the smooth launch support mode. As illustrated in FIG. 14, the motor torque is maintained at the torque T1 if the accelerator opening is from 0 to AOc, and the motor torque increases linearly in accordance with an increase in the accelerator opening if the accelerator opening is from AOc to AOd. If the accelerator opening is larger than AOd, the motor torque is maintained even if the accelerator opening is further increased. The vehicle driving force in (a) of FIG. 13 is realized by the motor torque. At this time, the engine RPM in (c) of FIG. 13 is an idle RPM below the belt grip RPM N1, and the power of the engine 21 is not transmitted to the belt 29 of the CVT 26. As illustrated in (b) of FIG. 13, if the vehicle speed reaches the engine drive start vehicle speed V2 because of an increase in the motor torque, the traveling state is switched to a subsequent first phase of the middle stage of launch.

Figure 15:
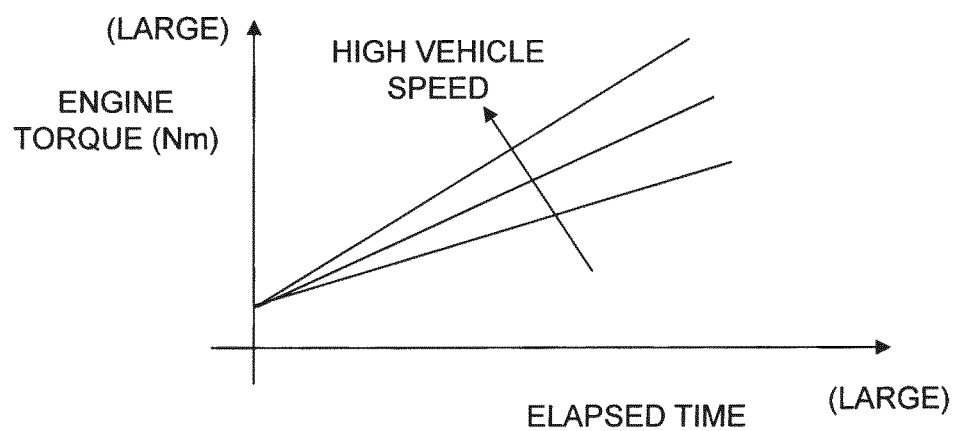
FIG. 15 is a graph illustrating a relationship among an elapsed time, a vehicle speed, and an engine torque in a first phase of a middle stage of launch in the smooth launch support mode.

FIG. 15 is a graph illustrating a relationship among an elapsed time, a vehicle speed, and an engine torque in the first phase of the middle stage of launch in the smooth launch support mode. In the first phase of the middle stage of launch, as illustrated in (c) of FIG. 13, the control device 70 increases the engine RPM in accordance with an increase in the accelerator opening, and, as illustrated in FIG. 15, outputs an engine torque corresponding to the elapsed time and the vehicle speed. Specifically, the engine torque increases linearly according to the increase in the time elapsed since switching to the middle stage of launch, and the inclination of the straight line increases as the vehicle speed increases. The motor torque in the first phase of the middle stage of launch is similar to that in FIG. 14. After a time when the engine RPM reaches the belt grip RPM N1, that is, when the power of the engine 21 is transmitted to the belt 29 of the CVT 26, the overall vehicle driving force is realized by the driving force of both the engine 21 and the motor 22. As shown in the column of the first phase of the middle stage of launch in FIG. 12, if a belt grip determination time (FIG. 13) being a predetermined time elapses while the engine RPM continues to be equal to or greater than the belt grip RPM N1, the traveling state is switched to a subsequent second phase of the middle stage of launch.

Figure 16:
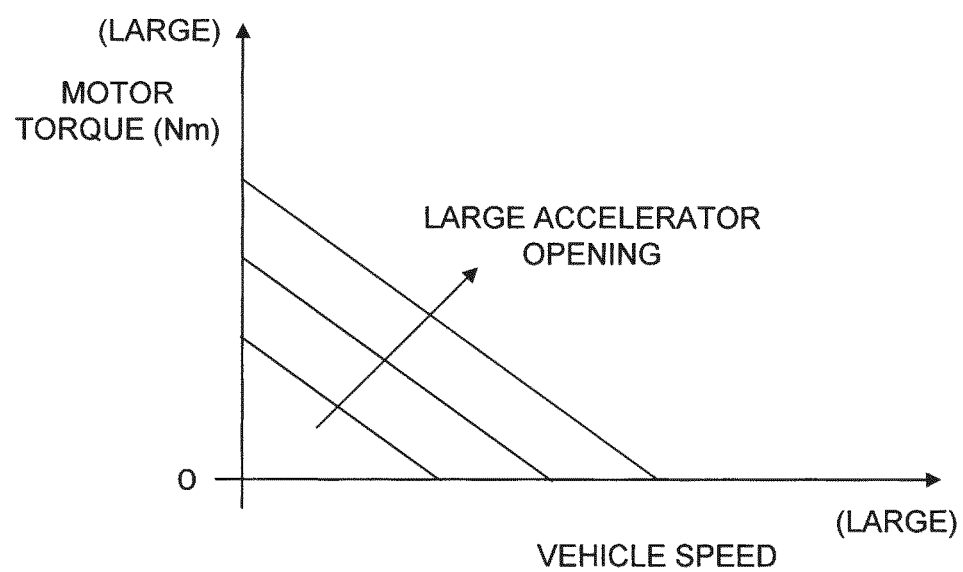
FIG. 16 is a graph illustrating a relationship among an accelerator opening, a vehicle speed, and a motor torque in a second phase of a middle stage of launch in the smooth launch support mode.

FIG. 16 is a graph illustrating a relationship among an accelerator opening, a vehicle speed, and a motor torque in the second phase of the middle stage of launch in the smooth launch support mode. In the second phase of the middle stage of launch, the control device 70 controls the driving of the motor 22 using the relationship in FIG. 16. Specifically, the motor torque decreases linearly decreases as the vehicle speed increases. A plurality of straight lines representing the relationship between the vehicle speed and the motor torque are set according to the accelerator opening, and the straight lines are set such that the motor torque increases as the accelerator opening increases. On the other hand, an engine torque is output from the engine 21 according to the accelerator opening. For example, similarly to the engine torque in the sudden launch support mode illustrated in FIG. 10, the engine torque increases linearly as the accelerator opening increases. As a result, as illustrated in (a) of FIG. 13, in the second phase of the middle stage of launch, the driving force of the vehicle by the motor 22 decreases not abruptly but gradually, and reaches 0, and the driving force by the engine 21 increases in accordance with the decrease in the driving force of the vehicle by the motor 22 to exceed the decreased amount, and consequently it is possible to increase the driving force of the vehicle. In addition, when the smooth launch support mode is executed, the control device 70 raises and then lowers the output of the motor 22 as time passes, and increases the output of the engine 21 over time from a time the output of the motor 22 is near the maximum value. As a result, as indicated by the arrow 13 in (a) of FIG. 13, it is possible to reduce the output of the motor 22 while smoothly increasing the driving force of the vehicle in the middle stage of launch. In the middle stage of launch, the torque of the motor 22 is reduced after the engine RPM reaches the belt grip RPM N1 and the predetermined belt grip determination time elapses, and therefore, it is possible to increase the driving force of the vehicle more smoothly.

Figure 17:
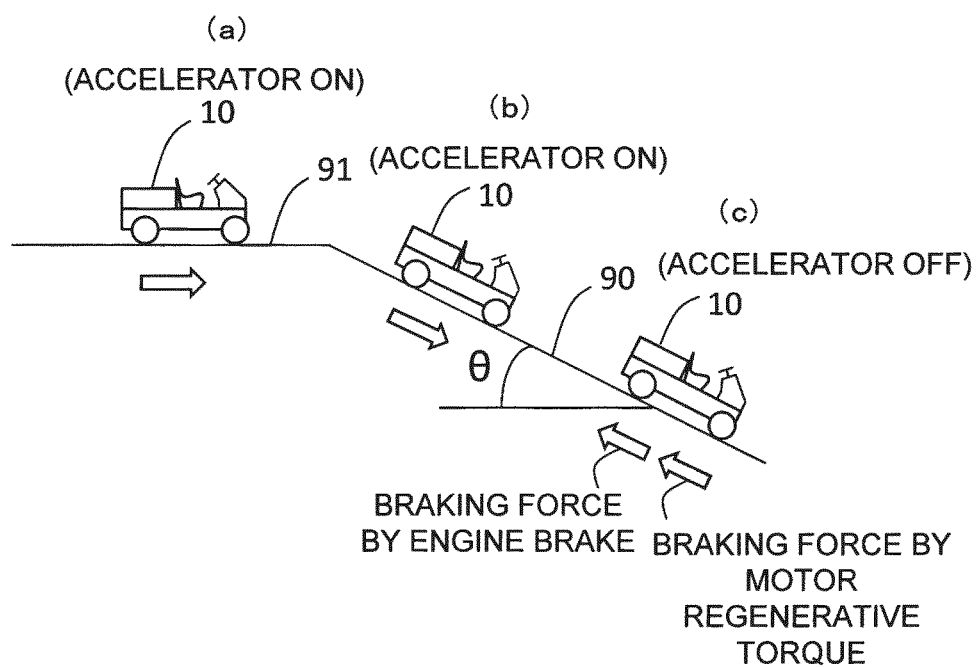
FIG. 17 is a diagram illustrating a state in which a hybrid vehicle shifts from traveling on a flat road to traveling on a downhill slope, and a state in which a regeneration support mode is executed during traveling on the downhill slope.

Next, the control at the time of selecting each of the regeneration support mode, the slip support mode, the sudden acceleration support mode, and the slope support mode will be described in sequence with reference to FIG. 17 to FIG. 24. FIG. 17 is a diagram illustrating a state in which the vehicle 10 shifts from traveling on a flat road 91 to traveling on a downhill slope 90, and a state in which the regeneration support mode is executed during traveling on the downhill slope 90.

When the regeneration support mode is selected, the control device 70 enters the downhill slope 90 if the vehicle 10 is driven by the engine 21 to travel, and if the accelerator pedal 60 is turned from on to off; that is, the accelerator pedal 60 is not operated, an engine brake and a braking force by a regenerative torque of the motor 22 are generated as a braking force of the vehicle. For example, the control device 70 may be configured to execute the regeneration support mode if the regeneration support execution condition in which an instruction to select the regeneration support mode is input, the forward-reverse lever 62 is at a position other than the neutral position, the engine 21 is driven, the accelerator pedal 60 is turned off, the vehicle speed detection value is within a predetermined range, and the brake pedal 63 is turned off is satisfied. When the regeneration support mode is executed, the control device 70 controls the inverter 24a connected to the motor 22 so that the regenerative torque is generated. As a result, the vehicle speed can be reduced more quickly than when the vehicle is braked only by the engine brake. Therefore, the driver can easily realize comfortable traveling.

In addition to the regeneration support execution condition described above, only if an inclination angle θ of the downhill slope 90 detected by the inclination angle sensor 66 is equal to or larger than a predetermined regeneration support determination inclination angle, the control device 70 may be configured to execute the regeneration support mode. As a result, it is possible to prevent frequent generation of the regenerative torque on a downhill slope having a slight inclination angle, and thus prevent frequent occurrence of sudden deceleration. For example, as illustrated in (a) of FIG. 17, if the accelerator pedal 60 is turned on, and the vehicle 10 is driven by the engine to travel on the flat road 91, the regeneration support mode is not executed because the inclination angle of the road surface is 0. As illustrated in (b) of FIG. 17, when the vehicle 10 enters the downhill slope 90 having the inclination angle θ equal to or larger than the regeneration support determination inclination angle, if the accelerator pedal 60 is still on, the regeneration support mode is not executed. On the other hand, as illustrated in (c) of FIG. 17, if the vehicle 10 is traveling on the downhill slope 90, the accelerator pedal 60 is turned off, and the regeneration support execution condition is satisfied, the regeneration support mode is executed, and the regenerative torque is generated by the motor 22. As a result, the braking force by the regenerative torque is added to the braking force by the engine brake, and it is possible to reduce the vehicle speed more quickly.

Figure 18:
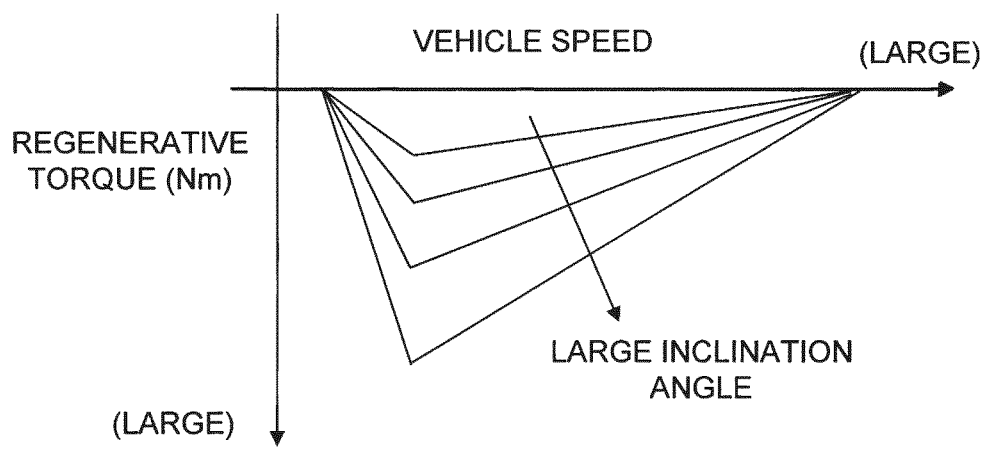
FIG. 18 is a graph illustrating a relationship between a regenerative torque of an electric motor, a vehicle speed, and an inclination angle of a downhill slope in a control when the regeneration support mode is selected.

FIG. 18 is a graph illustrating a relationship between a regenerative torque of the motor 22, a vehicle speed, and an inclination angle of a downhill slope in a control when the regeneration support mode is selected. If the vehicle speed is within a predetermined range, the regenerative torque gradually increases as the vehicle speed increases, and if the vehicle speed is above a predetermined value, the regenerative torque decreases as the vehicle speed increases. The larger the downhill inclination angle, the greater the regenerative torque. The control device 70 may calculate the regenerative torque from the relationship illustrated in FIG. 18, and the vehicle speed detection value and the inclination angle detection value, and may control the inverter 24a to output the calculated regenerative torque. As a result, either or both when the vehicle speed is high or/and when the inclination angle is small, it is possible to prevent the driver from being given an impact force at a high deceleration due to the generation of a large regenerative torque.

Figure 19:
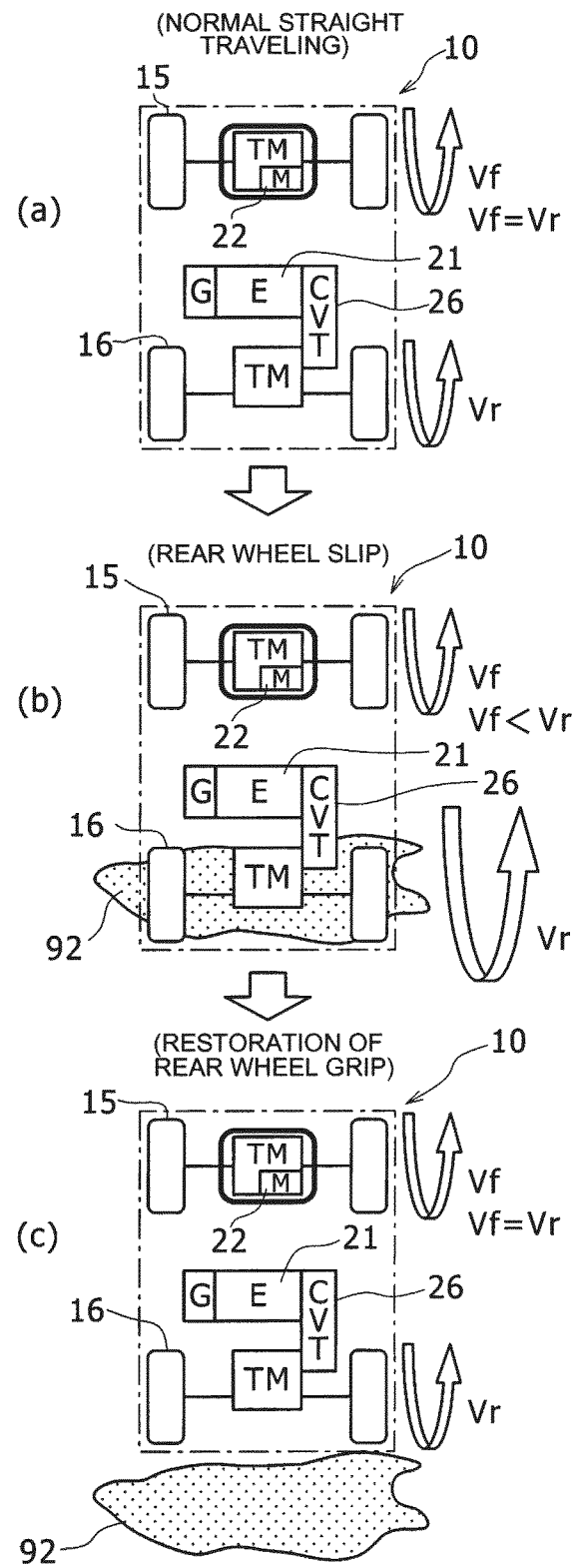
FIG. 19 illustrates a shift of the vehicle from a normal straight traveling state to a rear wheel slip state and then a rear wheel grip restoration state, and a relationship between a front wheel rotation speed and a rear wheel rotation speed in each of the states in a control when the slip support mode is selected.

FIG. 19 illustrates a shift of the vehicle 10 from a normal straight traveling state to a rear wheel slip state and then a rear wheel grip restoration state, and also a relationship between a front wheel rotation speed Vf and a rear wheel rotation speed Vr in each of the states in a control when the slip support mode is selected. When the slip support mode is selected, if the vehicle 10 drives the engine 21 in the engine traveling mode or the like, and the vehicle 10 is traveling with the motor 22 stopped, the rear wheels 16 slip into a low friction portion 92 such as muddy tracks, and as a result, when the rotation speed Vr of the rear wheels 16 exceeds the rotation speed Vf of the front wheels 15, the control device 70 drives the motor 22, and the vehicle 10 is restored from the slip state to the slip-free state by the driving force.

At this time, it is possible to increase the forward force by driving the motor 22 during the forward movement, and when the rear wheels 16 are gotten out of the low friction portion 92 and the rear wheel rotation speed Vr increases to match the front wheel rotation speed Vf, the motor 22 is stopped to end the slip support mode. For example, as illustrated in (a) of FIG. 19, during a normal straight advance in which the vehicle moves forward with the engine 21 being driven and the motor 22 being stopped, the front wheel rotation speed Vf matches the rear wheel rotation speed Vr. On the other hand, as illustrated in (b) of FIG. 19, when the rear wheels 16 slip into the low friction portion 92, the rear wheel rotation speed Vr exceeds the front wheel rotation speed Vf, and thus, the motor 22 is driven. As illustrated in (c) of FIG. 19, when the rear wheels 16 are gotten out of the low friction portion 92, the grip of the rear wheels 16 is restored, and the rear wheel rotation speed Vr matches the front wheel rotation speed Vf, and thus the slip support mode ends. Even if the slip support mode is thus executed, the driver easily realizes comfortable traveling.

The control device 70 may also cause the generators GE1 and GE2 to generate electric power equivalent to the generated output of the motor 22 when the slip support mode is executed. In this case, for example, the control device 70 executes the slip support mode if the slip support execution condition that an instruction to select the slip support mode is input, the forward-reverse lever 62 is at a position other than the neutral position, the engine 21 is driven, the charge amount of the battery 23 is below a predetermined amount, the accelerator pedal 60 is turned on, a value obtained by subtracting the front wheel rotation speed Vf from the rear wheel rotation speed Vr is equal to or above a predetermined value, the brake pedal 63 is turned off, and the regeneration support mode is not being executed is satisfied. When the slip support mode is executed, the control device 70 may drive the motor 22, and also cause the generators GE1 and GE2 to generate the electric power equivalent to the generated output of the motor 22. For example, the output of the motor 22 is expressed by (required motor torque)×2π×(motor RPM)/60. At this time, it is possible to determine the sum of the electric power generation torque being the torque with which the generators GE1 and GE2 generate electric power by the (output of the motor 22)×60/(engine rotation speed×2π). If only one of the generators GE1 and GE2 is provided in the vehicle, it is possible to determine the electric power generation torque by the (output of the motor 22)×60/(engine rotation speed×2π). As a result, it is possible to suppress a decrease in charge amount of the battery 23.

Figure 20:
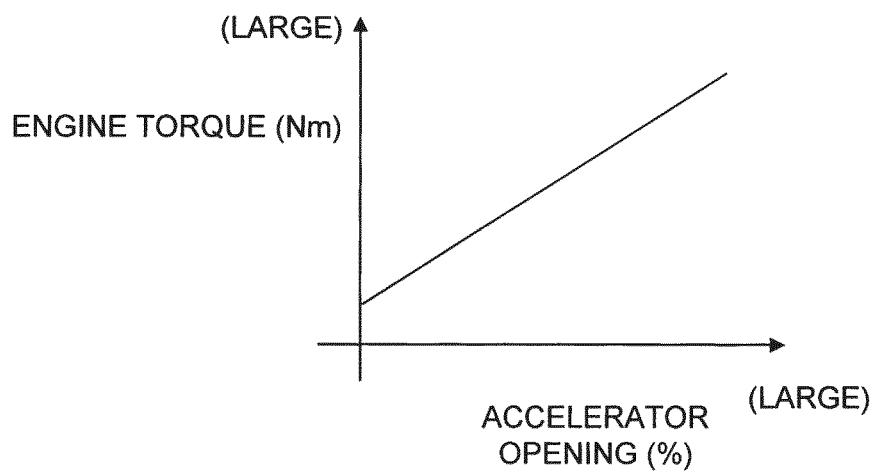
FIG. 20 is a graph illustrating a relationship between an accelerator opening and an engine torque in a control when the slip support mode is selected.

FIG. 20 is a graph illustrating a relationship between an accelerator opening and an engine torque in a control when the slip support mode is selected. The control device 70 generates an engine torque in accordance with the accelerator opening when the slip support mode is executed. At this time, it is possible to linearly increase the engine torque in accordance with an increase in the accelerator opening as illustrated in FIG. 20.

Figure 21:
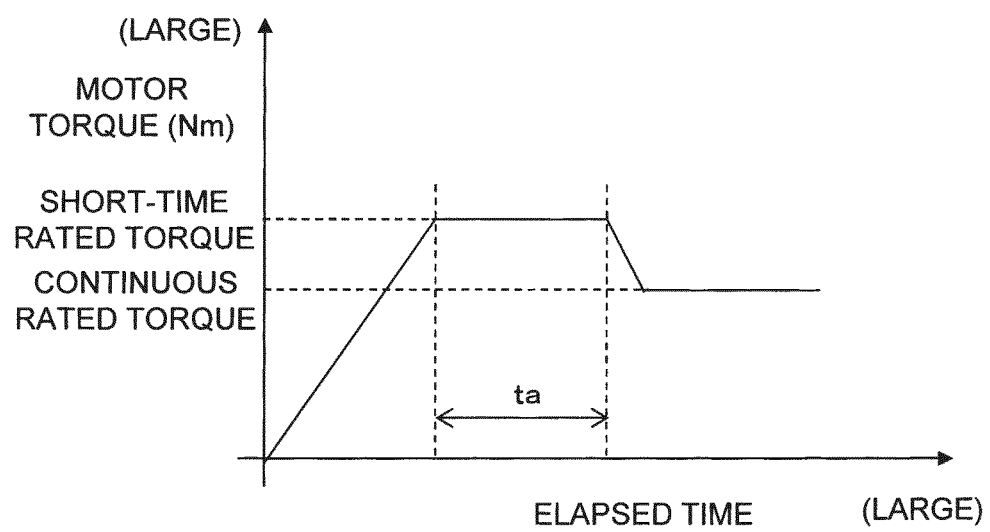
FIG. 21 is a graph illustrating a relationship between an elapsed time and a motor torque in a control when the slip support mode is selected.

FIG. 21 is a graph illustrating a relationship between an elapsed time and a motor torque in a control when the slip support mode is selected. As illustrated in FIG. 21, when the slip support mode is executed, the control device 70 may increase and maintain the motor torque for a predetermined time ta until the motor torque reaches a short-period predetermined time allowable torque that is higher than the continuous rated torque in accordance with an increase in the elapsed time from a time when the driving of the motor 22 is started. The predetermined time allowable torque is a torque that is allowed to be output only within the short-period predetermined time ta from the viewpoint of motor protection. The control device 70 can thereafter reduce the motor torque to the continuous rated torque and maintain the torque value. As a result, by rapidly increasing the motor torque, the vehicle easily shifts to a slip-free state.

If the vehicle turns in any direction when the vehicle drives the engine to travel forward, the rotation speed Vf of the front wheels 15 is higher than the rotation speed Vr of the rear wheels 16 due to the steering of the front wheels 15, and consequently it is possible to prevent the motor 22 from being unnecessarily driven when there is no slipping during the driving of the engine.

Figure 22:
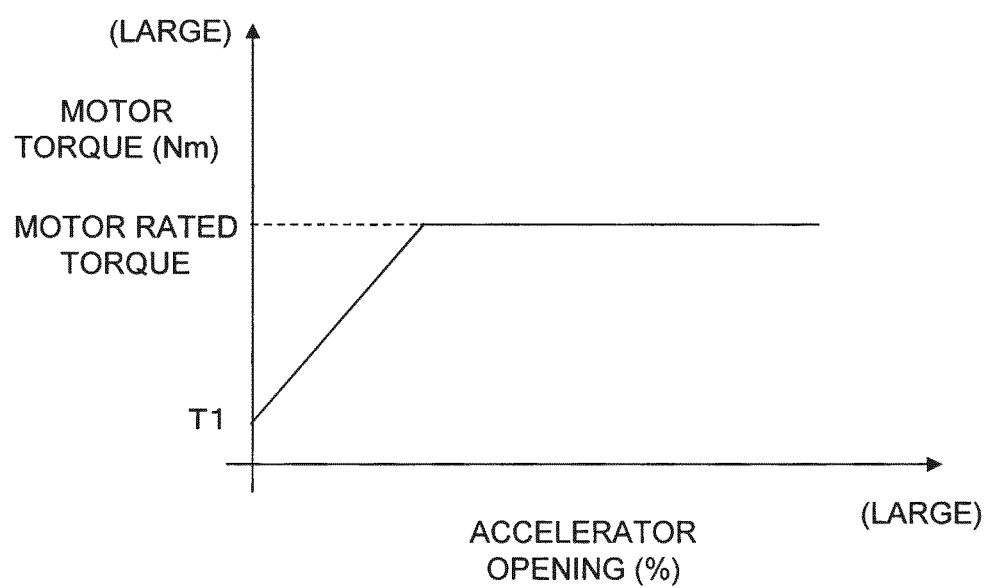
FIG. 22 is a graph illustrating a relationship between an accelerator opening and a motor torque in a control when the sudden acceleration support mode is selected.
Figure 23:
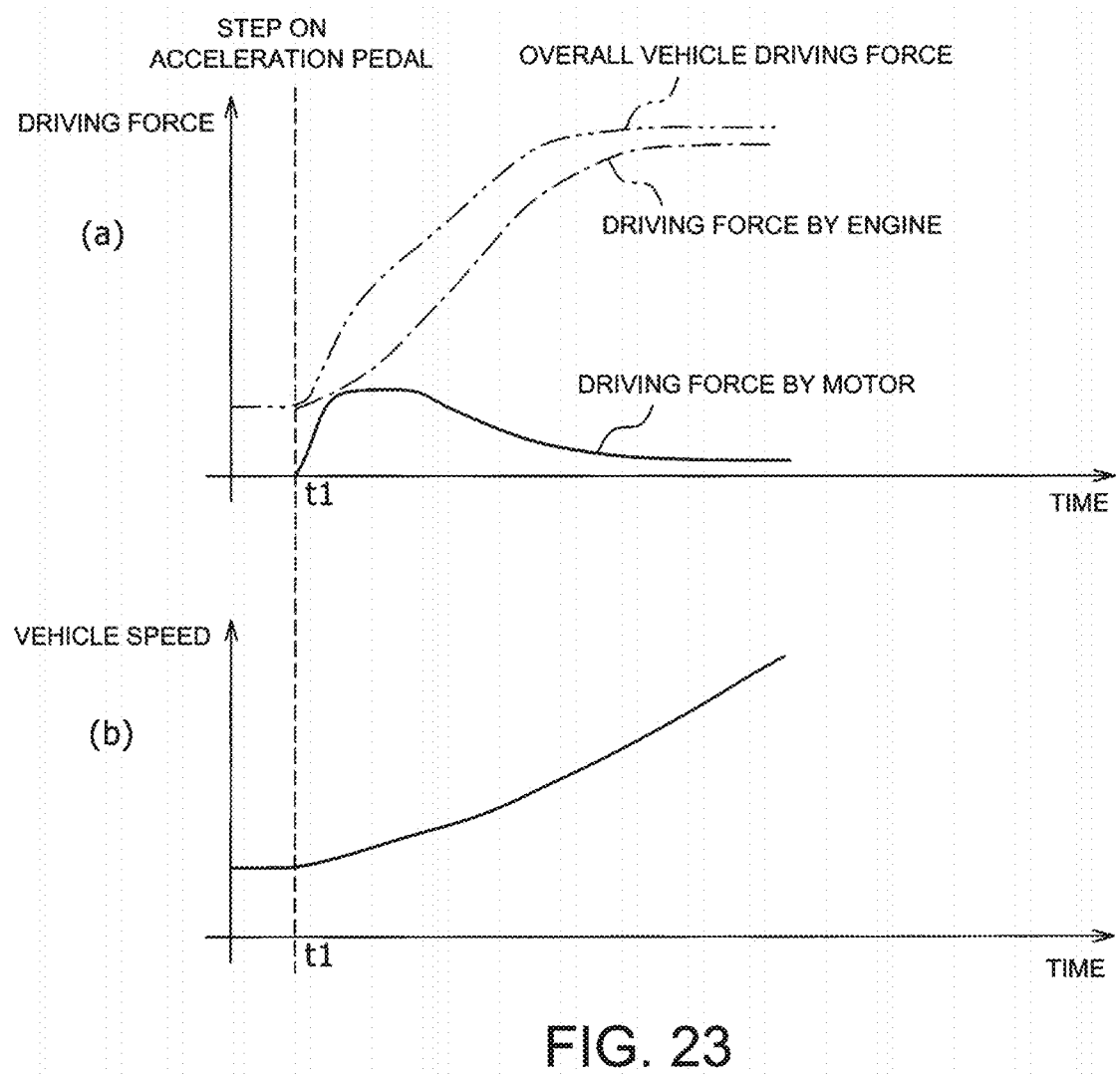
FIG. 23 is graphs each illustrating a vehicle driving force and a vehicle speed over time in a case where the accelerator opening is constant in a control when the sudden acceleration support mode is selected.

FIG. 22 is a graph illustrating a relationship between an accelerator opening and a motor torque in a control when the sudden acceleration support mode is selected. FIG. 23 is a set of graphs each illustrating a vehicle driving force and a vehicle speed over time in a case where the accelerator opening is constant in a control when the sudden acceleration support mode is selected. When the sudden acceleration support mode is selected, if the vehicle 10 drives the engine 21 to travel, the control device 70 accelerates the vehicle 10 by adding the driving force of the motor 22 to the driving force of the engine 21. For example, the control device 70 executes the sudden acceleration support mode if the sudden acceleration support execution condition that an instruction to select the sudden acceleration support mode is input, the forward-reverse lever 62 is at a position other than the neutral position, the engine 21 is driven, the charge amount of the battery 23 is equal to or more than a predetermined sudden acceleration support determination amount, the detected accelerator opening is equal to or greater than a predetermined sudden acceleration support determination opening, the accelerator change speed being the time change rate of the accelerator opening is equal to or greater than a predetermined sudden acceleration support determination speed, the brake pedal 63 is turned off, and the regeneration support mode, the slip support mode, or the launch support mode is not being executed is satisfied. If the sudden acceleration support mode is executed, the motor 22 is driven, but the speed of the vehicle 10 can be increased more rapidly than when the motor 22 is stopped, and therefore, the driver easily realizes comfortable traveling.

For example, as illustrated in FIG. 22, if the execution of the sudden acceleration support mode is started, the control device 70 rapidly increases the motor torque in accordance with the increase in the accelerator opening until the motor torque reaches the motor rated torque, and it is possible to maintain the motor torque even if the accelerator opening increases. Thus, as illustrated in (a) of FIG. 23, if the vehicle 10 drives the engine to travel, it is possible to start driving of the motor 22 by stepping on the accelerator pedal 60 at a time t1. As a result, it is possible to increase the overall vehicle driving force together with an increase in the driving force of the engine 21. Therefore, as illustrated in (b) of FIG. 23, the vehicle speed can be rapidly increased after the accelerator pedal 60 is stepped on. At this time, the relationship between the accelerator opening and the engine torque is similar to that in FIG. 20, and it is possible to increase the engine torque in accordance with an increase in accelerator opening.

Figure 24:
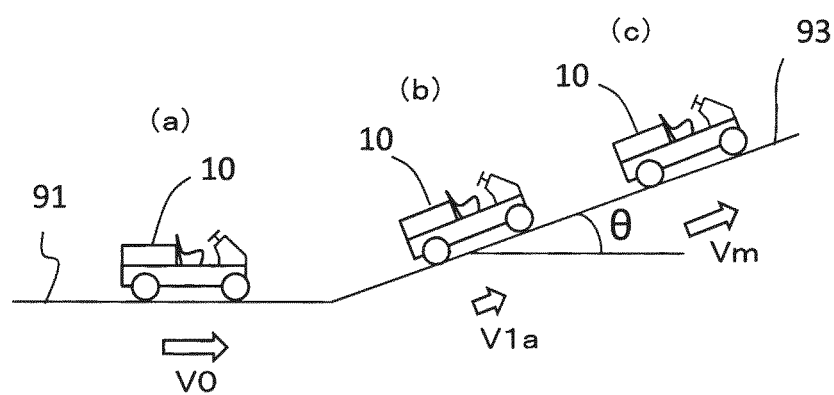
FIG. 24 is a diagram illustrating a vehicle position (a) during traveling on a flat road, a vehicle position (b) at a start of a slope support mode, and a vehicle position (c) obtained when a target vehicle speed is reached by executing the slope support mode.

FIG. 24 is a diagram illustrating a vehicle position (a) when a vehicle travels on the flat road 91, a vehicle position (b) at the start of the slope support mode, and a vehicle position (c) when a target vehicle speed is reached by executing the slope support mode. When the slope support mode is selected, if the vehicle 10 drives the engine 21 to travel, the control device 70 drives the motor 22 so that a vehicle speed V1a being a speed of approaching an uphill slope 93 and a vehicle speed Vm being a speed of passing through the uphill slope 93 are equal. For example, the control device 70 executes the slope support mode if the slope support execution condition that an instruction to select the slope support mode is input, the forward-reverse lever 62 is at a position other than the neutral position, the engine 21 is driven, the charge amount of the battery 23 is equal to or greater than a predetermined slope support determination amount, the inclination angle θ detected by the inclination angle sensor 66 is equal to or larger than a predetermined slope support inclination angle, the accelerator pedal 60 is turned on, the brake pedal 63 is turned off, and the regeneration support mode, the slip support mode, the sudden acceleration support mode, or the launch support mode is not being executed is satisfied. For example, as illustrated in (a) of FIG. 24, when the vehicle 10 drives the engine to travel on the flat road 91, the slope support mode is not executed because the inclination angle of the road surface is 0. As illustrated in (b) of FIG. 24, when the vehicle 10 enters the uphill slope 93 having an inclination angle θ equal to or larger than the slope support inclination angle, the execution of the slope support mode is started, and the motor 22 is driven. The control device 70 stores the vehicle speed V1a at the start of execution of the slope support mode in a storage unit. The control device 70 controls the motor 22 with the vehicle speed V1a as the target vehicle speed while the vehicle 10 is traveling on the uphill slope 93. For example, the control device 70 matches the vehicle speed Vm with the vehicle speed V1a when the vehicle 10 is located at the position illustrated in (c) of FIG. 24. As a result, the driver can drive the vehicle while automatically maintaining the same vehicle speed as the speed of approaching the uphill slope 93, and therefore, the driver easily realizes comfortable traveling. Therefore, the driver easily realizes comfortable traveling even if any of the regeneration support mode, the slip support mode, the sudden acceleration support mode, and the slope support mode described with reference to FIG. 17 to FIG. 24 is executed.

Figure 25:
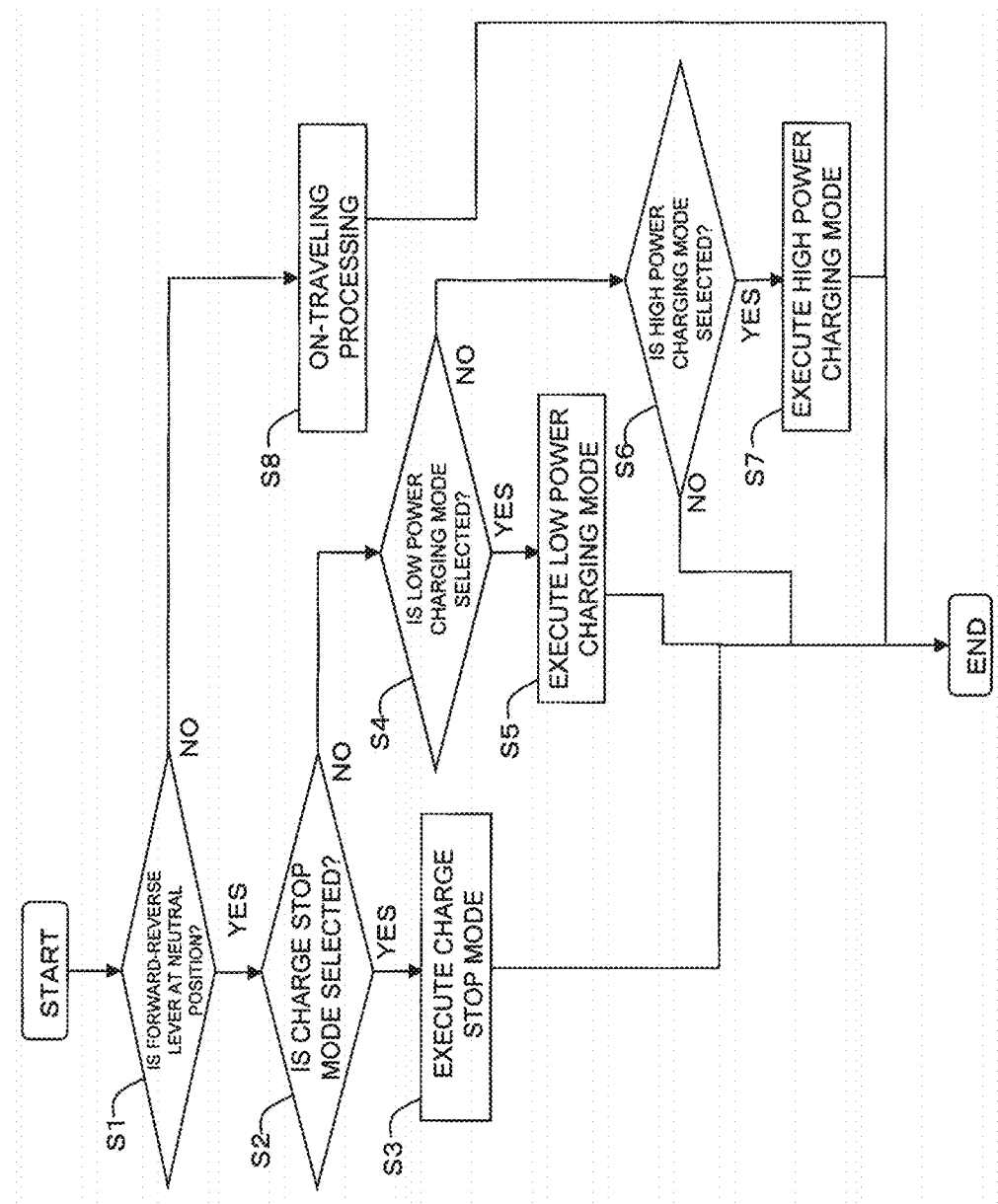
FIG. 25 is a flowchart illustrating a method of switching a battery charging mode in the embodiment.

FIG. 25 is a flowchart illustrating a method of switching a charging mode of the battery 23 in the embodiment. Steps S1 to S8 are executed by the control device 70. In step S1, from a detection signal of the lever sensor 53, a determination is made as to whether the forward-reverse lever 62 is in the neutral position. If YES is determined in step S1, a determination is made that the vehicle is in a stopped state, the processing proceeds to step S2, and the stopped vehicle charging process in steps S2 to S7 is executed. If NO is determined in step S1, the processing proceeds to step S8, and the on-traveling processing is executed. For example, if the condition that only the engine 21 is driven as the drive source is satisfied, the on-traveling processing by driving the engine is executed.

On the other hand, in step S2, a determination is made as to whether the charge stop mode is selected by the driver touching the operation panel 52. If YES is determined in step S2, the charge stop mode is executed in step S3. In the charge stop mode, for example, the engine is driven with the idle torque at the idle RPM as the required engine torque. At this time, the electric power generation by the generators GE1 and GE2 is stopped, and the charging of the battery 23 from the generators GE1 and GE2 is stopped.

On the other hand, if NO is determined in step S2, in step S4 a determination is made as to whether the low power charging mode is selected by the driver touching the operation panel 52. If YES is determined in step S4, the low power charging mode is executed in step S5. In the low power charging mode, the engine 21 is driven with, for example, the (idle torque+the predetermined low power charging torque) as the required engine torque. The low power charging torque is lower than the high power charging torque described later. The generators GE1 and GE2 generate electric power with a low power charging torque as the required generator torque. As a result, a low power charge in which the battery 23 is charged at a low charging speed is executed because of the electric power generation by the generators GE1 and GE2.

If NO is determined in step S4, in step S6 a determination is made as to whether a high power charging mode is selected by the driver touching the operation panel 52. If YES is determined in step S6, the high power charging mode is executed in step S7. In the high power charging mode, the engine 21 is driven with, for example, the (idle torque+the predetermined high power charging torque) as the required engine torque. The high power charging torque is higher than the low power charging torque. The generators GE1 and GE2 generate electric power with a low power charging torque as the required generator torque. As a result, a high power charge in which the battery 23 is charged at a charging speed higher than that in the low power charging mode is executed, because of the electric power generation by the generators GE1 and GE2. During even the execution of any of the charge stop mode, the low power charging mode, and the high power charging mode in steps S3, S5, and S7, the required motor torque of the motor 22 is 0 Nm and the required motor RPM is 0 $min^{-1}$. On the other hand, if NO is determined in step S6, the control of switching the charging mode ends. The control of switching of the charging mode also ends when the execution of any of steps S3, S5, and S7 ends.

As described above, the charging mode is switchable between the low power charging mode and the high power charging mode, and as a result, it is possible to switch the battery 23 to an appropriate charging mode. For example, if a user can switch the charging mode, an appropriate charging mode can be selected from the viewpoint of efficiency or battery protection according to a time during which the vehicle 10 stops.

According to the vehicle 10 described above, in the vehicle 10 in which the rear wheels 16 are driven by the engine 21 and the front wheels 15 are driven by the motor 22, if the operation amount of the accelerator pedal 60 is not 0 or is substantially not 0, any of the minute speed launch support mode, the sudden launch support mode, and the smooth launch support mode is executed in accordance with an operation status of the accelerator pedal 60. As a result, if the driver desires a smooth launch in the low-speed range by operating the accelerator pedal 60, the minute speed launch support mode is executed, and if the driver desires to quickly reach a high-speed range, the sudden launch support mode is realized, and in the sudden launch support mode, the vehicle is accelerated by the motor 22 and the engine 21. As a result, it is possible to realize a launch performance that may reflect, if not perfectly, an intention of the driver in accordance with the traveling state, and when a small motor 22 is used, it is possible to prevent an excessive load from being applied to the motor 22 in the high-speed range, and consequently the durability of the motor 22 can be improved. When the smooth launch support mode is executed, it is possible to reduce the driving force of the motor 22 in the high-speed range and accelerate the vehicle only by the engine 21, and consequently the energy efficiency can be improved.

It is noted that a support mode in FIG. 5B may be selected not through the operation panel 52, and may be selected through one or more switches.

Figure 26:
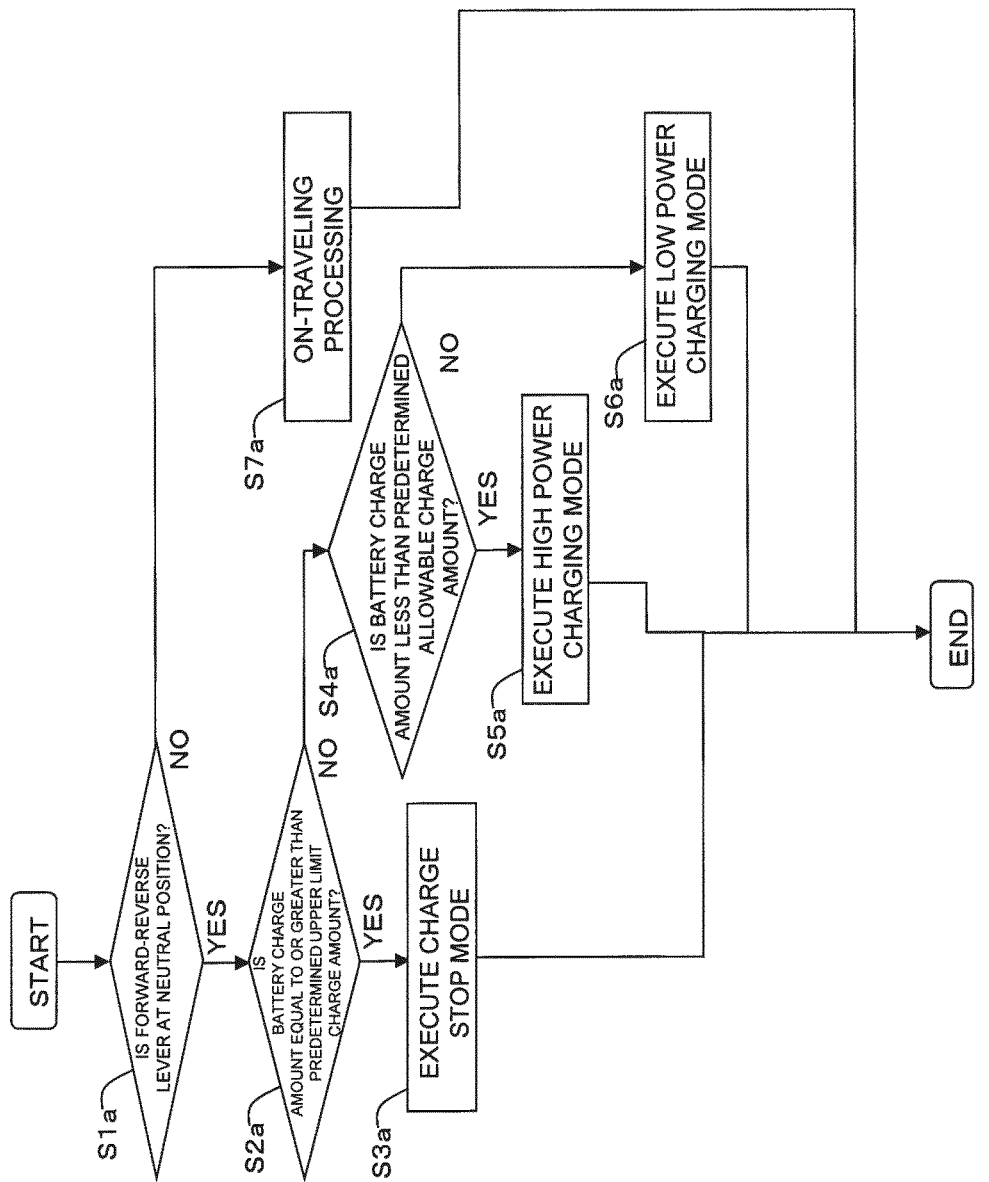
FIG. 26 is a flowchart illustrating a method of switching a battery charging mode in another example of the embodiment according to the present disclosure.

FIG. 26 is a flowchart illustrating a method of switching a charging mode of the battery 23 in another example of the embodiment. In the configurations in FIG. 1 to FIG. 25, the description is provided in which the battery charging mode is switched by being selected through the operation panel 52, as described in FIG. 25. On the other hand, in the present example, the battery charging mode is automatically switched by the control device 70. Specifically, in accordance with the charge amount of the battery 23 detected by the battery monitoring module 65, the high power charging mode is executed if the charge amount is less than a predetermined allowable charge amount, and the low power charging mode is executed if the charge amount is equal to or greater than the predetermined allowable charge amount. The high power charging mode and the low power charging mode are similar to the case of the configuration described with reference to FIG. 25.

Specifically, the processing in steps S1a to S7a in FIG. 26 is executed by the control device 70. In step S1a, from a detection signal of the lever sensor 53, a determination is made as to whether the forward-reverse lever 62 is in the neutral position. If YES is determined in step S1a, the processing proceeds to step S2a, and the stopped vehicle charging process in steps S2a to S6a is executed. If NO is determined in step S1a, the processing proceeds to step S7a, and the on-traveling processing is executed.

On the other hand, in step S2a, a determination is made as to whether the charge amount of the battery 23 is equal to or greater than a predetermined upper limit charge amount. The predetermined upper limit charge amount is a charge amount higher than the predetermined allowable charge amount described later, and is set to protect the battery 23 by preventing overcharging of the battery 23. If YES is determined in step S2a, the charge stop mode is executed in step S3a. The charge stop mode is similar to the case of the configuration described with reference to FIG. 25.

If NO is determined in step S2a, in step S4a a determination is made as to whether the charge amount of the battery 23 is less than the predetermined allowable charge amount. If YES is determined in step S4a; that is, if the charge amount of the battery 23 is less than the predetermined allowable charge amount, there is a large margin until the charge amount reaches full charge, and so the high power charging mode is executed in step S5a. If NO is determined in step S4a; that is, if the charge amount of the battery 23 is equal to or greater than the predetermined allowable charge amount, the margin until the charge amount reaches full charge is small, and so the low power charging mode is executed in step S6a. The control of switching of the charging mode ends when the execution of steps S3a, S5a, and S6a ends.

In the case of the present example, similarly to the configurations in FIG. 1 to FIG. 25, the charging mode can be switched between the low power charging mode and the high power charging mode, and as a result, it is possible to switch the battery 23 to an appropriate charging mode. In the case of the present example, the charging mode is automatically switched by the control device 70 in accordance with the charge amount, and therefore, an appropriate charging mode is executed from the viewpoint of efficiency or battery protection in accordance with the charge amount. In the present example, the other configurations and operations are similar to those in FIG. 1 to FIG. 25.

In each of the above embodiments, the hybrid vehicle may have a configuration in which any one, two, or three of the regeneration support mode, the slip support mode, the sudden acceleration support mode, and the slope support mode can be executed during travel when the engine is driven.

In each of the above embodiments, the case where the regeneration support mode, the slip support mode, the sudden acceleration support mode, and the slope support mode are executed when selected through the operation panel 52 is described. On the other hand, the hybrid vehicle may be configured so that at least two of the regeneration support mode, the slip support mode, the sudden acceleration support mode, and the slope support mode can be executed, and any one of the support modes is executed in accordance with the traveling state of the vehicle.

For example, the hybrid vehicle may be configured so that all of the regeneration support mode, the slip support mode, the sudden acceleration support mode, and the slope support mode can be executed. At this time, in the configurations illustrated in FIG. 1 to FIG. 25, the control device may execute the regeneration support mode if the condition that the input of an instruction for selecting the regeneration support mode is excluded from the regeneration support execution condition is satisfied. In the configurations illustrated in FIG. 1 to FIG. 25, the control device may execute the slip support mode if the condition that the input of an instruction for selecting the slip support mode is excluded from the slip support execution condition is satisfied. In the configurations illustrated in FIG. 1 to FIG. 25, the control device may execute the sudden acceleration support mode if the condition that the input of an instruction for selecting the sudden acceleration support mode is excluded from the sudden acceleration support execution condition is satisfied. In the configurations illustrated in FIG. 1 to FIG. 25, the control device may execute the slope support mode if the condition that the input of an instruction for selecting the slope support mode is excluded from the slope support execution condition is satisfied.

Figure 27:
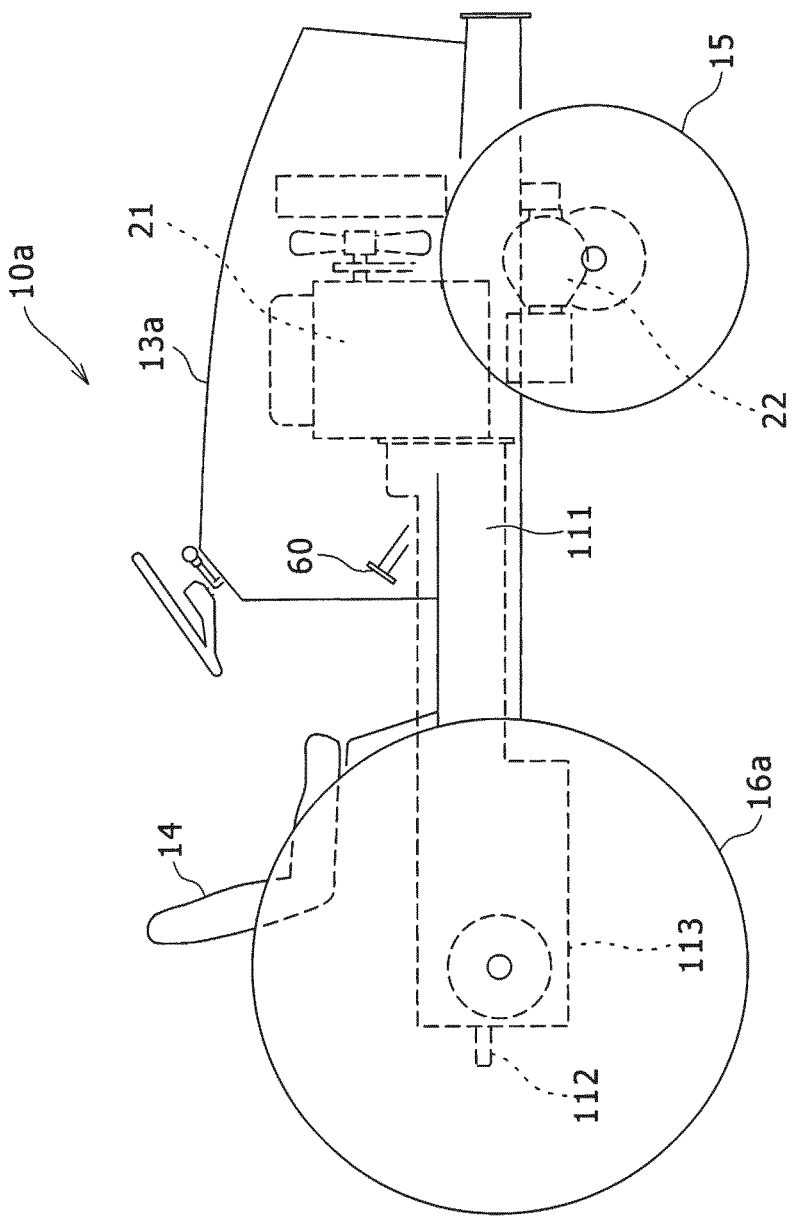
FIG. 27 is a side view of a hybrid vehicle in another example of the embodiment according to the present disclosure.

FIG. 27 is a side view of a hybrid vehicle 10*a* according to another example of the embodiment. Although in the configuration of each example described above, the case where the vehicle 10 (FIG. 1) is an off-road type utility vehicle including a loading platform is described, in the present example, the hybrid vehicle 10*a* is an agricultural tractor in which a working machine (not illustrated) for agricultural work is connected on a rear side. The hybrid vehicle 10*a* includes the front wheels 15 and rear wheels 16*a* supported on the front and rear sides of a frame 111, and the engine 21 and the motor 22 supported on the front side of the frame 111. The front wheels 15 are driven by the motor 22, and the rear wheels 16*a* are driven by the engine 21. The engine 21 is covered with a front cover 13*a* having a hood and side covers. A working machine can be connected to the rear part of the vehicle, and a PTO shaft 112 for driving the working machine projects from a rear end of a case 113 having a power transmission unit that transmits the power from the engine 21. The accelerator pedal 60 is arranged in front of the driver's seat 14, and a detection signal of the accelerator opening is transmitted from the first pedal sensor 54 (see FIG. 3A) to the control device 70 (see FIG. 3A).

In such a hybrid vehicle 10*a*, similarly to the configuration of each example described above, the vehicle includes the minute speed launch support mode, the sudden launch support mode, and the smooth launch support mode, and is configured so that any of the support modes described above is executed in accordance with an operation status of the accelerator pedal 60. In the present example, the other configurations and operations are similar to those in FIG. 1 to FIG. 25, or in FIG. 26.

Figure 28:
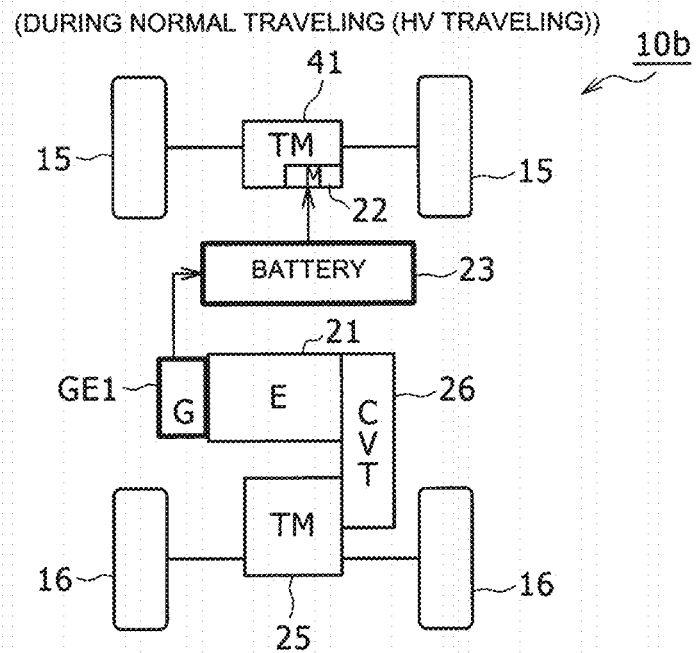
FIG. 28 is a diagram illustrating a configuration of a hybrid vehicle in yet another example of the embodiment according to the present disclosure, and is a diagram illustrating a state during normal traveling without sudden acceleration.
Figure 29:
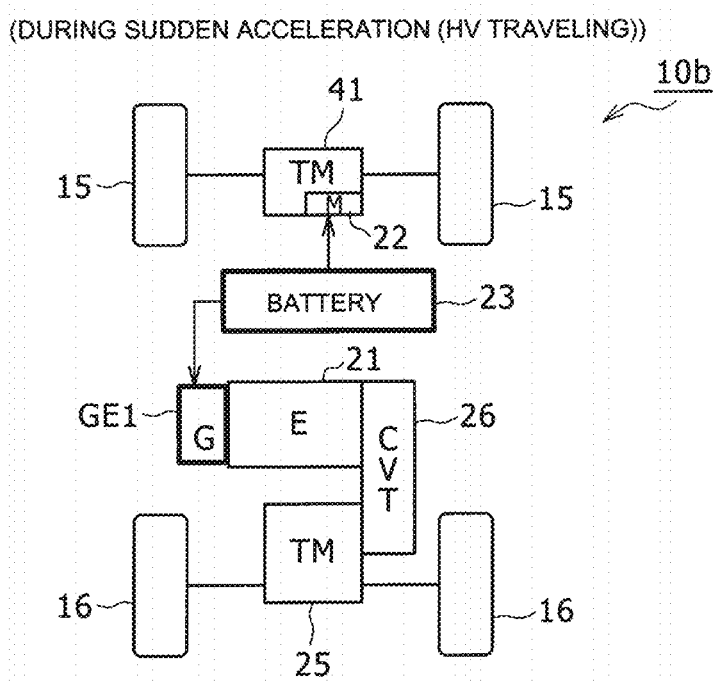
FIG. 29 is a diagram illustrating a configuration of the hybrid vehicle in FIG. 28, and is a diagram illustrating a state during sudden acceleration.

FIG. 28 is a diagram illustrating a configuration of a hybrid vehicle 10*b* in yet another example of the embodiment, and is a diagram illustrating a state during normal traveling without sudden acceleration. FIG. 29 is a diagram illustrating a configuration of the hybrid vehicle 10*b* in FIG. 28, and is a diagram illustrating a state during sudden acceleration. According to the configuration in the present example, during normal traveling during which the control device 70 (FIG. 2) determines that the driver provides no instructions for sudden acceleration in the configurations of FIG. 1 to FIG. 25, electric power is supplied from the generator GE1 driven by the engine 21 to the battery 23 as in an electric power flow indicated by arrows in FIG. 28. The generator GE is arranged, for example, on the rear side of the vehicle. The control device 70 drives the motor 22 by supplying electric power from the battery 23 to the motor 22 arranged on the front side of the vehicle. The driving force of the motor 22 is transmitted to the front wheels 15 via the front power transmission unit 41. At this time, the power of the engine 21 is transmitted to the rear wheels 16 via the CVT 26 and the rear power transmission unit 25, so that a four-wheel drive mode is realized.

On the other hand, if the control device 70 determines that the driver provides an instruction for sudden acceleration, electric power is supplied from the battery 23 to the generator GE1 as well as the motor 22 as in an electric power flow indicated by the arrows in FIG. 29. Thus, if the generator GE1 is used as a motor, the rotation of the crankshaft of the engine 21 is assisted by the generator GE1. This makes it easier to increase the rotation speed of the engine 21. For this reason, the torque of the engine 21 is likely to increase, and thus, the vehicle is likely to suddenly accelerate during four-wheel drive traveling. As for the instruction for sudden acceleration, for example, the control device 70 can determine that an instruction for sudden acceleration is provided if determining that a stepping-on speed of the accelerator pedal 60 is equal to or greater than a predetermined value, based on a detection signal from the first pedal sensor 54 (FIG. 3A) that detects an operation amount of the accelerator pedal 60 (FIG. 3A), and otherwise determine that no instructions for sudden acceleration are provided. In the present example, the other configurations and operations are similar to those in FIG. 1 to FIG. 25.

In each of the examples described above, the rear wheels 16 and 16*a* may be driven by a motor and the front wheels 15 may be driven by an engine. At this time, the first wheels are the front wheels 15, and the second wheels are the rear wheels 16 and 16*a*.

The acceleration instruction unit is not limited to the accelerator pedal, and the acceleration instruction unit may be configured by, for example, a pair of operation levers supported on both the left and right sides of the driver's seat swingably in the front-rear direction. For example, the right front wheel is driven by a right motor, and the left front wheel is driven by a left motor. The front wheels corresponding to the operation levers can be rotated in the forward direction by tilting the left and right operation levers toward the front, and can be rotated in the reverse direction by tilting the left and right operation levers toward the back.

In each of the examples described above, a case where any of the launch support modes is executed when the launch support mode is selected through the operation panel 52 or the switch is described; however, the operation panel may be omitted, and any of the launch support modes may be executed in accordance with an operation status of the acceleration instruction unit.

In addition, in each of the examples described above, there may be employed a configuration in which switching among the regeneration support mode, the slip support mode, the sudden acceleration support mode, the slope support mode, and the charging mode is not performed. (178) In each of the examples described above, it may be the case that the launch support mode is not also performed.

A hybrid vehicle in at least one of the above embodiments includes the hybrid vehicle according to the present disclosure related to a first disclosure. Therefore, in a hybrid vehicle in which the first wheels are driven by an engine and the second wheels are driven by a motor, it is possible to realize a launch performance that may reflect, if not perfectly, an intention of the driver in accordance with the traveling state when a small motor is used. At the same time, it is possible to improve the energy efficiency and motor durability.

At least one of the above embodiments discloses the hybrid vehicle according to the present disclosure related to a second disclosure. A first hybrid vehicle according to the present disclosure related to the second disclosure is a hybrid vehicle including an engine that drives first wheel, and a motor that drives second wheel separated from the first wheel in a front-rear direction, such that the first hybrid vehicle can execute, when the engine is driven, at least one of a regeneration support mode in which a regenerative brake of the motor is used when the vehicle decelerates on a downhill slope, a slip support mode in which the vehicle is returned from a slip state to a slip-free state by the driving force of the motor when the first wheel slip, a sudden acceleration support mode in which the vehicle is accelerated by adding a driving force of the motor to a driving force of the engine, and a slope support mode in which the motor is driven so that a speed of approaching an uphill slope and a speed of passing through an uphill slope are equal.

A second hybrid vehicle according to the present disclosure related to the second disclosure is a hybrid vehicle including an engine that drives first wheel, a motor connected to a battery, the motor that drives second wheel separated from the first wheel in a front-rear direction, and a generator driven by the engine, the generator that charges the battery, such that the second hybrid vehicle is configured to switch among a low power charging mode in which the battery is charged, a high power charging mode in which the battery is charged and the charging speed of the battery is higher than that of the low power charging mode, and a charge stop mode in which the charging of the battery is stopped.

A third hybrid vehicle according to the present disclosure related to the second disclosure is a hybrid vehicle including an engine that drives first wheel, and a motor connected to a battery, the motor that drives second wheel separated from the first wheel in a front-rear direction, and a generator driven by the engine, the generator that charges the battery, such that the third hybrid vehicle can execute, while stopped, when the engine is driven, either of a low power charging mode in which the battery is charged, and a high power charging mode in which the battery is charged and the charging speed of the battery is higher than that of the low power charging mode, and can execute, when the vehicle is traveling, at least one of a regeneration support mode in which a regenerative brake of the motor is used when the vehicle decelerates on a downhill slope, a slip support mode in which the vehicle is returned from a slip state to a slip-free state by the driving force of the motor when the first wheel slip, a sudden acceleration support mode in which the vehicle is accelerated by adding a driving force of the motor to a driving force of the engine, and a slope support mode in which the motor is driven so that a speed of approaching an uphill slope and a speed of passing through an uphill slope are equal.

The hybrid vehicle according to the present disclosure related to the second disclosure solves the following problems. In a hybrid vehicle having a conventional structure in which first wheel is driven by an engine and second wheel is driven by a motor, it is desired that the driver realizes comfortable traveling when the engine is driven. It is also desired to switch to an appropriate charging mode a battery that supplies electric power to the motor. An object of the hybrid vehicle according to the present disclosure related to the second disclosure is at least one of realization of comfortable traveling by the driver when the engine is driven, and switching to an appropriate charging mode of the battery, in a hybrid vehicle in which the first wheel is driven by the engine and the second wheel is driven by the motor.

According to the first and third hybrid vehicles of the present disclosure related to the second disclosure, in a hybrid vehicle in which the first wheel is driven by the engine and the second wheel is driven by the motor, it is possible for the driver to realize comfortable traveling when the engine is driven. According to the second and third hybrid vehicles of the present disclosure related to the second disclosure, in a hybrid vehicle in which the first wheel is driven by the engine and the second wheel is driven by the motor, it is possible to switch the battery to an appropriate charging mode.

At least one of the above embodiments discloses a configuration where, in the first hybrid vehicle according to the present disclosure related to the second disclosure, at least two support modes of the regeneration support mode, the slip support mode, the sudden acceleration support mode, and the slope support mode can be executed, and any one of the support modes is executed in accordance with a traveling state of the vehicle.

At least one of the above embodiments discloses a configuration where, in the first hybrid vehicle according to the present disclosure related to the second disclosure, the regeneration support mode is executed only if the downhill slope is equal to or more than a predetermined inclination angle.

At least one of the above embodiments discloses a configuration where the first hybrid vehicle according to the present disclosure related to the second disclosure includes a generator driven by the engine, and the execution of the slip support mode is stopped when the speeds of the first wheel and the second wheel are the same, and when the slip support mode is executed, electric power equivalent to the generated output of the motor is generated by the generator.

At least one of the above embodiments discloses a configuration where the first hybrid vehicle according to the present disclosure related to the second disclosure includes a control device that controls the motor, and when the slip support mode is executed, the control device increases a torque of the motor and maintains the torque of the motor for a predetermined time until the torque of the motor reaches a predetermined time allowable torque that is higher than a continuous rated torque in accordance with an increase in elapsed time from a time driving of the motor is started, and thereafter, reduces the torque of the motor to the continuous rated torque and maintains the torque of the motor.

At least one of the above embodiments discloses a configuration where, in the first hybrid vehicle according to the present disclosure related to the second disclosure, the first wheel driven by the engine is rear wheel, and the second wheel driven by the motor is front wheel.

At least one of the above embodiments discloses a configuration where the first hybrid vehicle according to the present disclosure related to the second disclosure includes a generator driven by the engine, and a control device that controls the motor, and execution of the slip support mode is stopped if the speeds of the first wheel and the second wheel are the same, and when the slip support mode is executed, electric power equivalent to the generated output of the motor is generated by the generator. When the slip support mode is executed, the control device increases a torque of the motor and maintains the torque of the motor for a predetermined time until the torque of the motor reaches a predetermined time allowable torque that is higher than a continuous rated torque in accordance with an increase in elapsed time from a time a driving of the motor is started, and thereafter, reduces the torque of the motor to the continuous rated torque and maintains the torque of the motor. The first wheel driven by the engine is rear wheel, and the second wheel driven by the motor is front wheel.

At least one of the above embodiments discloses a configuration where the second hybrid vehicle according to the present disclosure related to the second disclosure includes a charge monitoring unit that detects a charge amount of the battery, and if the charge amount of the battery is less than a predetermined allowable charge amount, the high power charging mode is executed, and if the charge amount of the battery is equal to or greater than the predetermined allowable charge amount, the low power charging mode is executed.

At least one of the above embodiments discloses a configuration where, in the second hybrid vehicle according to the present disclosure related to the second disclosure, the first wheel driven by the engine is rear wheel, and the second wheel driven by the motor is front wheel.

At least one of the above embodiments discloses a configuration where, in the second hybrid vehicle according to the present disclosure related to the second disclosure, when a four-wheel drive mode is executed, electric power equivalent to the generated output of the motor is generated by the generator by driving the engine.

At least one of the above embodiments discloses a configuration, where in the second hybrid vehicle according to the present disclosure related to the second disclosure, the first wheel driven by the engine is rear wheel, and the second wheel driven by the motor is front wheel, and when the four-wheel drive mode is executed, electric power equivalent to the generated output of the motor is generated by the generator by driving the engine.

At least one of the above embodiments discloses a configuration where the first hybrid vehicle or the second hybrid vehicle according to the present disclosure related to the second disclosure is an off-road type utility vehicle or an agricultural tractor including a loading platform and traveling on rough terrain.

What is claimed is:

1. A hybrid vehicle comprising: an engine that drives first wheels; and
    a motor that drives second wheel separated from the first wheel in a front-rear direction, wherein
    the hybrid vehicle includes:
    (1) a minute speed launch support mode in which the hybrid vehicle is driven only by the motor serving as a drive source;
    (2) a sudden launch support mode in which the hybrid vehicle is driven by the engine and the motor serving as the drive source; and
    (3) a smooth launch support mode in which the hybrid vehicle is driven only by the motor serving as the drive source in an early stage, is driven by the engine and the motor serving as the drive source in a middle stage, and is driven only by the engine serving as the drive source in a late stage, and
    if an operation amount of an acceleration instruction unit is not 0 or is substantially not 0, any one of the support modes is executed in accordance with an operation status of the acceleration instruction unit.

2. The hybrid vehicle according to claim 1, comprising: a control device that controls the motor and the engine, wherein
    if the operation amount of the acceleration instruction unit is less than a first predetermined value and a vehicle speed is equal to or less than a predetermined speed, the control device executes the minute speed launch support mode.

3. The hybrid vehicle according to claim 2, wherein the minute speed launch support mode is executable even if the operation amount is 0, and
    when the minute speed launch support mode is executed, a relationship between a torque of the motor and the operation amount is a relationship in which a predetermined torque is generated if the operation amount is 0.

4. The hybrid vehicle according to claim 3, wherein the first wheel driven by the engine is rear wheel, and the second wheel driven by the motor is front wheel.

5. The hybrid vehicle according to claim 1, comprising: a control device that controls the motor and the engine, wherein
    if the operation amount of the acceleration instruction unit is equal to or greater than a second predetermined value more than a first predetermined value, and a time change rate of the operation amount is equal to or greater than a predetermined time change rate, the control device executes the sudden launch support mode, and
    when the sudden launch support mode is executed, a degree by which a torque of the motor increases in accordance with an increase in the operation amount is more than a degree by which a torque of the motor increases in accordance with an increase in the operation amount when the minute speed launch support mode is executed.

6. The hybrid vehicle according to claim 5, wherein when the sudden launch support mode is executed, a relationship between a torque of the motor and the operation amount is a relationship in which a predetermined torque is generated if the operation amount is 0.

7. The hybrid vehicle according to claim 6, wherein the first wheel driven by the engine is rear wheel, and the second wheel driven by the motor is front wheel.

8. The hybrid vehicle according to claim 1, comprising: a control device that controls the motor and the engine, wherein
when the smooth launch support mode is executed, the control device raises and then lowers an output of the motor, and increases an output of the engine over time from a time when the output of the motor is near a maximum value.

9. The hybrid vehicle according to claim 8, comprising: a CVT including a belt engaged with a driving pulley connected to an output shaft of the engine via a centrifugal clutch and a driven pulley fixed to an input shaft of a wheel-side power transmission unit, wherein the centrifugal clutch disconnects the connection between the output shaft and the driving pulley if a rotation speed of the engine is less than a predetermined speed, and connects the output shaft and the driving pulley if a rotation speed of the engine is equal to or greater than a predetermined speed.

10. The hybrid vehicle according to claim 9, wherein the first wheel driven by the engine is rear wheel, and the second wheel driven by the motor is front wheel.

11. The hybrid vehicle according to claim 1, wherein the hybrid vehicle is an off-road type utility vehicle or a tractor including a loading platform, the off-road type utility vehicle or the tractor being for traveling on rough terrain.

\* \* \* \* \*